US012212105B2

(12) United States Patent
Chahine et al.

(10) Patent No.: US 12,212,105 B2
(45) **Date of Patent: *Jan. 28, 2025**

(54) SYSTEMS AND METHODS FOR SENSORY PLATFORM INTERCONNECTION

(71) Applicant: MYANT INC., Toronto (CA)

(72) Inventors: Tony Chahine, Toronto (CA); Michelle Zheng, Toronto (CA); Adrian Philip Straka, Toronto (CA); Milad Alizadeh-Meghrazi, Toronto (CA)

(73) Assignee: MYANT INC., Toronto (CA)

( * ) Notice: Subject to any disclaimer, the term of this patent is extended or adjusted under 35 U.S.C. 154(b) by 624 days.

This patent is subject to a terminal disclaimer.

(21) Appl. No.: 17/470,670

(22) Filed: Sep. 9, 2021

(65) Prior Publication Data

US 2021/0408746 A1 Dec. 30, 2021

Related U.S. Application Data

(63) Continuation of application No. 16/735,839, filed on Jan. 7, 2020, now Pat. No. 11,121,515, which is a (Continued)

(51) Int. Cl.
*H01R 33/94* (2006.01)
*A41D 31/04* (2019.01)
(Continued)

(52) U.S. Cl.
CPC ............ *H01R 33/94* (2013.01); *A41D 31/04* (2019.02); *D04B 1/24* (2013.01); *D04B 21/207* (2013.01);
(Continued)

(58) Field of Classification Search
None
See application file for complete search history.

(56) References Cited

U.S. PATENT DOCUMENTS 6,097,607 A 8/2000 Carroll et al.
8,758,241 B2 6/2014 Charles, Jr. et al.
(Continued)

FOREIGN PATENT DOCUMENTS

CN 106723423 A 5/2017
JP 55136173 9/1980
(Continued)

OTHER PUBLICATIONS

United States Patent and Trademark Office, Non-Final Rejection Office Action dated Jan. 25, 2021 for U.S. Appl. No. 16/735,839.
(Continued)

*Primary Examiner* — James Harvey
(74) *Attorney, Agent, or Firm* — Norton Rose Fulbright Canada LLP

(57) ABSTRACT

A textile interconnection system for a textile substrate. The textile substrate may include at least one conductive fibre configured to transmit at least one of a power or data signal. The textile interconnection system includes a textile receptacle projecting from the textile substrate to define a cavity for receiving a controller device. The textile interconnection system includes a textile docking device received within the textile receptacle and coupled to the at least one conductive fibre of the textile substrate to electrically interconnect the received controller device and the textile substrate. The textile interconnection system includes a housing coupled to the textile docking device and received within the textile receptacle to mechanically interconnect the received controller device and the textile substrate.

18 Claims, 30 Drawing Sheets

Related U.S. Application Data continuation-in-part of application No. PCT/CA2018/051654, filed on Dec. 21, 2018.

(60) Provisional application No. 62/789,356, filed on Jan. 7, 2019, provisional application No. 62/614,380, filed on Jan. 6, 2018.

(51) Int. Cl.

| | |
|---|---|
| ***D04B 1/24*** | (2006.01) |
| ***D04B 21/20*** | (2006.01) |
| ***H01R 13/52*** | (2006.01) |
| ***H01R 13/62*** | (2006.01) |
| ***H01R 33/965*** | (2006.01) |

(52) U.S. Cl.

CPC ..... *H01R 13/5202* (2013.01); *H01R 13/6205* (2013.01); *H01R 33/965* (2013.01); *A41D 2500/10* (2013.01); *D10B 2401/16* (2013.01); *D10B 2501/06* (2013.01)

(56) References Cited

U.S. PATENT DOCUMENTS

| | | | | |
|---|---|---|---|---|
| 9,028,404 | B2 | 5/2015 | DeRemer et al. | |
| 11,121,515 | B2 * | 9/2021 | Chahine | H01R 13/5202 |
| 2002/0124295 | A1 | 9/2002 | Fenwick et al. | |
| 2007/0299325 | A1 | 12/2007 | Farrell et al. | |
| 2012/0071039 | A1 | 3/2012 | Debock et al. | |
| 2015/0185765 | A1 | 7/2015 | Peek et al. | |
| 2017/0014073 | A1 | 1/2017 | Shoshani et al. | |
| 2017/0079348 | A1 | 3/2017 | Chahine et al. | |
| 2017/0093087 | A1 | 3/2017 | Esmaeili et al. | |
| 2017/0338610 | A1 | 11/2017 | Brunnbauer et al. | |
| 2018/0004250 | A1 | 1/2018 | Barnett et al. | |
| 2019/0165516 | A1 | 5/2019 | Li et al. | |
| 2020/0144777 | A1 | 5/2020 | Chahine et al. | |
| 2021/0408746 | A1 * | 12/2021 | Chahine | H01R 33/965 |
| 2022/0346227 | A1 * | 10/2022 | Zheng | H05K 1/038 |

FOREIGN PATENT DOCUMENTS

| | | | |
|---|---|---|---|
| JP | 2007504911 | A | 3/2007 |
| JP | 2009534546 | A | 9/2009 |
| JP | 2017188450 | A | 10/2017 |
| WO | 2016051160 | A2 | 4/2016 |
| WO | 2016054057 | A1 | 4/2016 |

OTHER PUBLICATIONS

World Intellectual Property Organization, International Search Report and Written Opinion dated Jun. 12, 2019 for International Application No. PCT/CA2018/051654.

* cited by examiner

DETAIL B
SCALE 8 : 7

SYSTEMS AND METHODS FOR SENSORY PLATFORM INTERCONNECTION

CROSS REFERENCE TO RELATED APPLICATIONS

This application is a continuation of U.S. patent application Ser. No. 16/735,839, filed on Jan. 7, 2020, and entitled "SYSTEMS AND METHODS FOR SENSORY PLATFORM INTERCONNECTION", which: (i) claims all benefit including priority to U.S. Provisional Patent Application No. 62/789,356, filed on Jan. 7, 2019, and (ii) is a continuation-in-part of PCT Patent Application number PCT/CA2018/051654, filed on Dec. 21, 2018, which claims priority from U.S. provisional patent application No. 62/614,380, filed on Jan. 6, 2018. The entire contents of each of these applications are hereby incorporated by reference.

TECHNICAL FIELD

Embodiments of the present disclosure generally relate to the field of smart textiles, and in particular to a textile interconnection system for a textile substrate.

BACKGROUND

Sensory devices, such as physiological data sensors, may be integrated or embedded into smart textiles. Smart textiles may include garments, such as clothing. When sensory devices are embedded into garments, the sensory devices may be positioned physically proximate to user limbs or body parts. The garments having the sensory devices embedded therein may be worn by users for extended durations of time and may be configured to generate sensory data over time.

Smart textiles are a fabric based system of materials and structures that sense and react to environmental conditions or stimuli, such as those from mechanical, thermal, chemical, electrical, magnetic or other sources. Smart textiles can react or adapt to external stimuli or changing environmental conditions. The stimuli can include changes in temperature, moisture, pH, chemical sources, electric or magnetic fields, mechanical stress or strain.

Advanced smart textiles can have embedded computing, digital components, electronics, energy supply, and sensors. Basic components of smart textiles include sensors, actuators, data transmission and electrical power. When functionality, size, cost, reliability, comfort and aesthetic/requirements are considered, it may be desirable to seamlessly integrate electronic components into the manufacturing of the textiles. Further, electrical connections between electrically conductive circuits of the textiles (e.g. conductive fibres, wires, etc., of the textile substrate) with electronic components, such as power sources and computational components (e.g. processor, memory, etc.) may require adaptable and/or reliable connection to the textiles.

Furthermore, textile manufacturing and electronics manufacturing may use vastly different manufacturing infrastructures, utilizing highly dissimilar assembly equipment, materials and processes.

It may be desirable to provide materials and manufacturing methods which can integrate the interconnection of electronics devices or electronics modules into textile based substrates.

SUMMARY

Textile interconnection systems for smart textiles, including smart garments, are described in the present application.

In one aspect, the present application provides a textile interconnection system for a textile substrate. The textile substrate may include at least one conductive fibre configured to transmit at least one of a power or data signal. The textile interconnection system may include: a textile receptacle projecting from the textile substrate to define a cavity for receiving a controller device. The textile interconnection system may also include a textile docking device received within the textile receptacle and coupled to the at least one conductive fibre of the textile substrate of the textile substrate to electrically interconnect the received controller device and the textile substrate. The textile interconnection system may also include a housing coupled to the textile docking device and received within the textile receptacle to mechanically interconnect the received controller device and the textile substrate.

In another aspect, the present application provides a garment. The garment may include a garment body including a textile substrate. The textile substrate may include at least one conductive fibre configured to transmit at least one of a power or data signal. The garment may include a textile interconnection system coupled to the textile substrate. The textile interconnection system may include a textile receptacle projecting from the textile substrate to define a cavity for receiving a controller device. The textile interconnection system may include a textile docking device received within the textile receptacle and coupled to the at least one conductive fibre of the textile substrate to electrically interconnect the received controller device and the textile substrate. The textile interconnection device may include a housing coupled to the textile docking device and received within the textile receptacle to mechanically interconnect the received controller device and the textile substrate.

In this respect, before explaining at least one embodiment in detail, it is to be understood that the embodiments are not limited in application to the details of construction and to the arrangements of the components set forth in the following description or illustrated in the drawings. It is to be understood that the phraseology and terminology employed herein are for the purpose of description and should not be regarded as limiting.

Further features and combinations thereof concerning embodiments described herein will appear to those skilled in the art following a reading of the present application.

BRIEF DESCRIPTION OF THE DRAWINGS

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
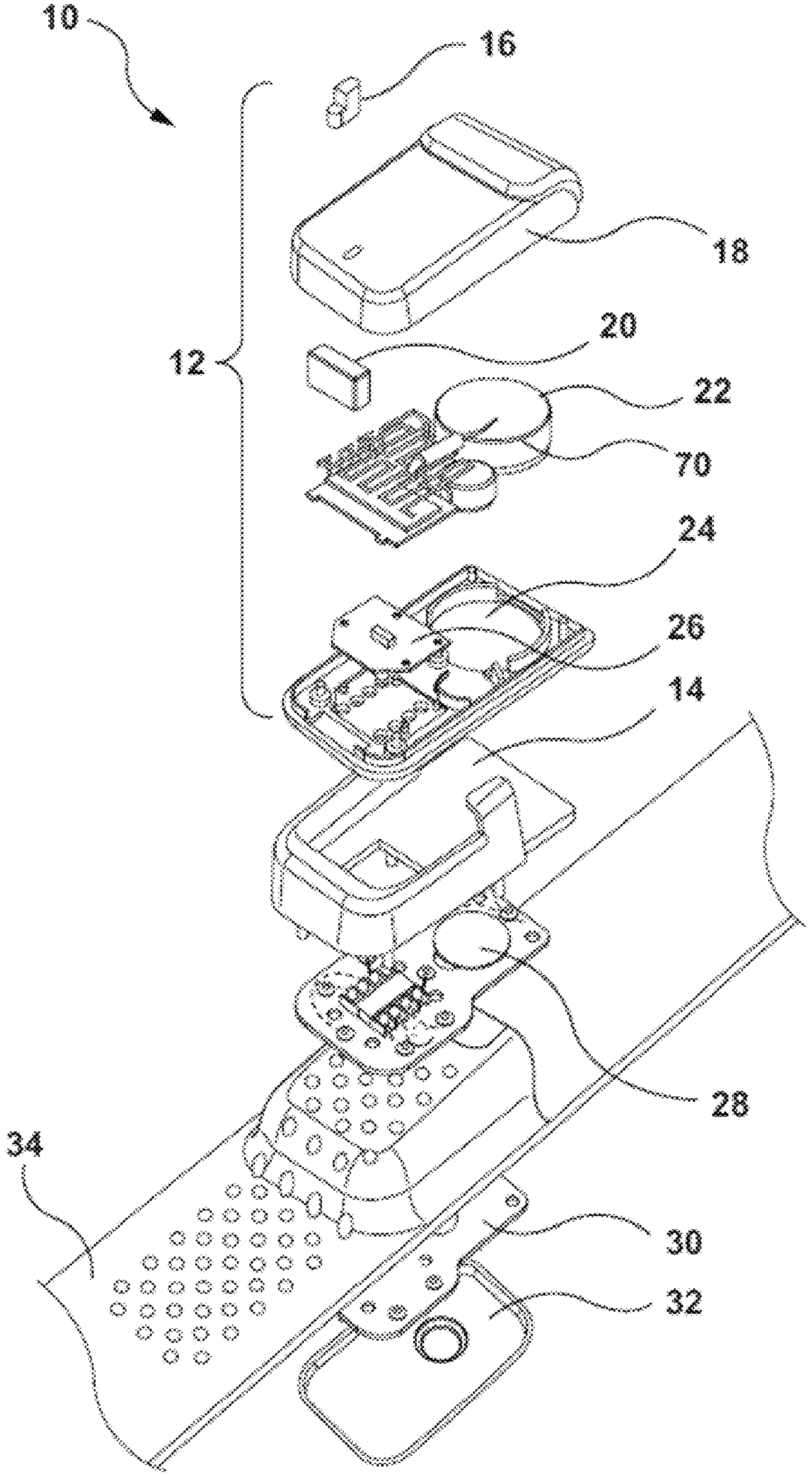
FIG. 1 illustrates a partial exploded perspective view of an electronic textile system, in accordance with an example embodiment of the present application.
Figure 4:
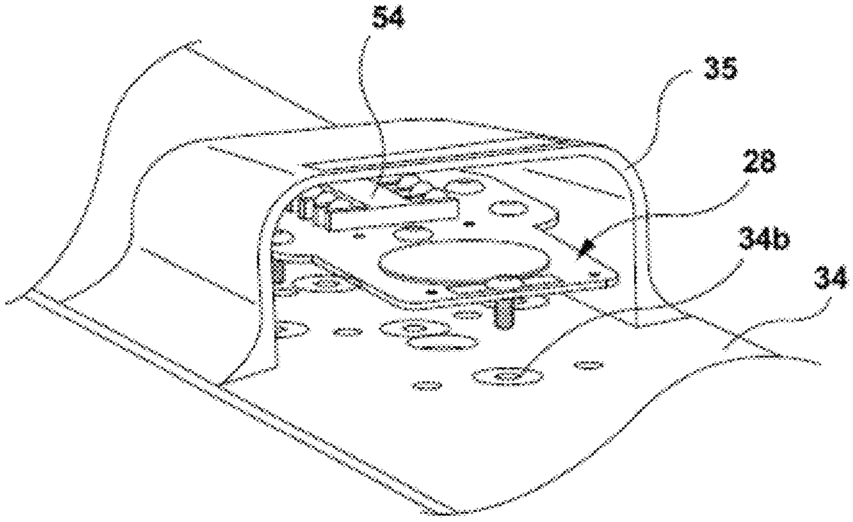
FIG. 4 illustrates a perspective view of the substrate component of FIG. 2 in relation to the textile substrate of FIG. 1.

Referring to FIG. 1, shown is an expanded (or exploded) view of an overall assembly 10 of a controller device 12 (e.g. electronic module) electrically connected to conductive pathways 80 (see FIG. 16) of a textile substrate 34 (e.g. in the form of a patch, band, shirt, pants, socks, undergarment, blanket, hat, glove, shoe, etc.) by way of a module dock station 14. As such, the module dock station 14 (see FIG. 5) can comprise a dock housing 50 having a body 14*a* with an aperture 52 for providing access between an electrical dock connector 54 (see FIG. 4) coupled to the conductive pathways 80 and an electrical controller connector 26 (see FIG. 1) that is connected to electronics 22 of the controller device 12, as further described below. The module dock station 14 can also have one or more clips 55 (as an example of a releasably securable mechanism for mechanically coupling with the housing 18,24 of the controller device 12). It is clear that the mating electrical connection between the electrical dock connector 54 and the electrical controller connector 26 is also releasably securable, thus facilitating repeated installation and removal of the controller device 12 with respect to the module dock station 14, both mechanically as well as electrically.

Periodic removal of the controller device 12 could be advantageous for recharging of a power source 70 (see FIG. 1) of the controller device 12, replacement/substitution of the controller device 12 (including the electronics 22), and/or temporary removal of the controller device 12 for washing/cleaning purposes of the textile substrate 34 (e.g. when washing a garment which integrally incorporates the textile substrate 34 as part of the overall garment construction).

Figure 6:
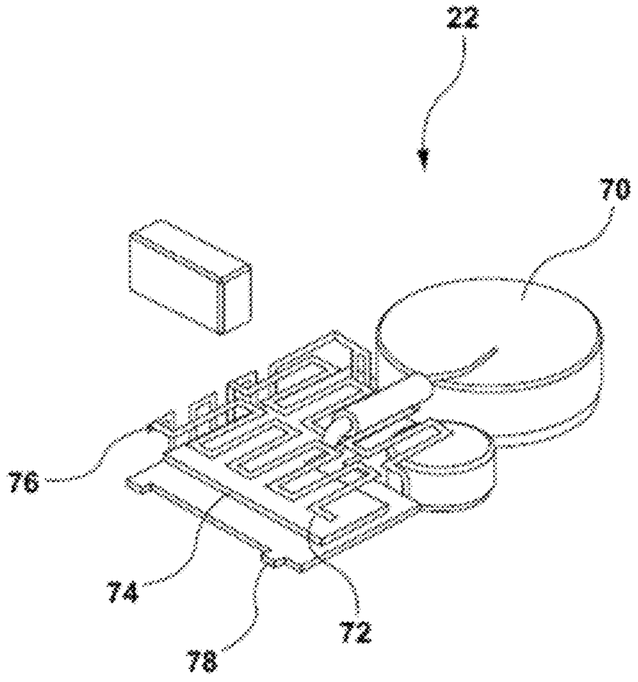
FIG. 6 provides an example embodiment of the electronic components of the controller device of FIG. 1.
Figure 7:
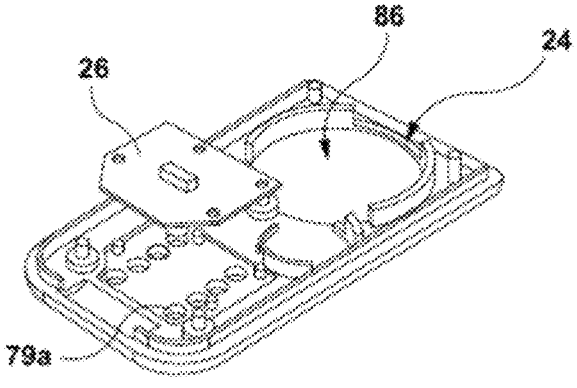
FIGS. 7 and 8 provide views of the interior of the controller device of FIG. 1.

Referring again to FIG. 1, the controller device 12 has a housing 18,24 (e.g. a top enclosure and a bottom enclosure) providing a moisture resistant housing for the enclosed electronics 22. For example, referring to FIG. 6, the electronics 22 can include a power source 70 (e.g. rechargeable battery) powering a memory 72 and a computer processor 74, such that the computer processor executes instructions store on the memory (e.g. ROM, RAM, etc.). The electrical connections between the electronics 22 can be by way of conductive pathways 76 (shown in concept) on a printed circuit board (PCB) or other electronics substrate 78. The conductive pathways 76 can be electrically connected to the electrical controller connector 26 (e.g. a socket connector—e.g. an 8 socket connector), such that the electrical controller connector 26 can be considered as integral within the housing 18,24 (see FIG. 7). As such, the electrical controller connector 26 can be considered as part of the controller device 12.

Figure 8:
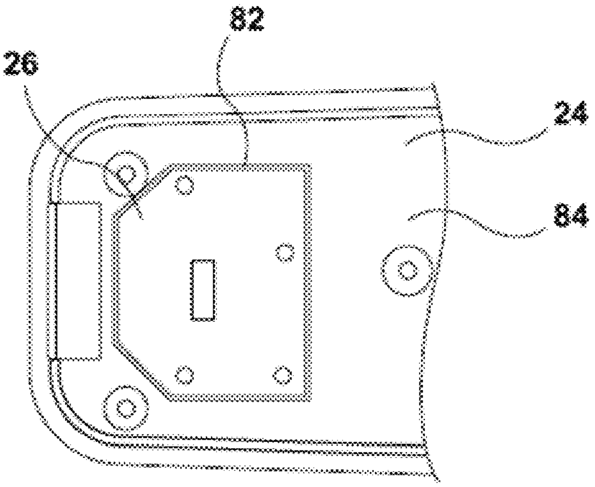

The bottom enclosure 24 of the housing can include apertures 79*a* for receiving corresponding pins 79*b* mounted on a body 54*a* of the electrical dock connector 54 (e.g. an 8 pin connector). It is also envisioned that the electrical dock connector 54 can be a socket connector and the electrical controller connector 26 can be a pin connector 26 configured for mating with the socket connector 54. It is also recognized that the electrical connectors 26,54 can have mating electrical connections other than of the pin/socket type (e.g. magnetic), as desired, in so much that the electrical connectors 26,54 are of the releasably securable type. As shown in FIG. 8, the electrical controller connector 26 can be sealed via a seal 82 (e.g. adhesive) with respect to an interior surface 84 (of the housing 18,24 when assembled). The seal 82 can be used to inhibit moisture or other foreign matter from entering into the interior 86 (see FIG. 7) via the apertures 79*a* (see FIG. 7).

Figure 2:
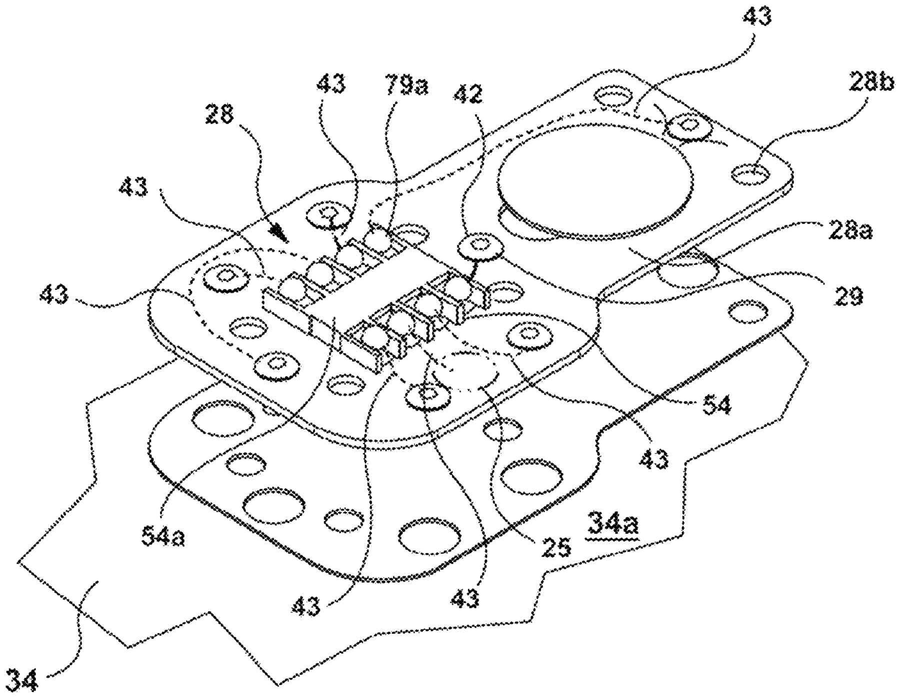
FIG. 2 illustrates a perspective view of a substrate component of the electronic textile system of FIG. 1.

Referring again to FIG. 1, the overall assembly 10 also includes a first substrate 28 and a second substrate 30 for mounting on either side of the textile substrate 34. For example, the first substrate 28 can be a PCB. As shown in FIG. 2, the first substrate 28 has the electrical dock connector 54 mounted thereon, with conductive pathways 43 connecting each of the one or more electrical connectors 79*b* (e.g. pins, sockets, etc.) of the electrical dock connector 54 with corresponding one or more electrical connection locations 42 mounted on the first substrate 28. It is recognized that the one or more electrical connection locations 42 can be distributed about a surface 28*a* of the first substrate 28, such that each of the locations of the one or more electrical connection locations 42 correspond (e.g. in relative distance from one another) with the conductive pathways 80 (see FIG. 16) laid out on/in the textile substrate 34. The first substrate 28 can also have one or more electrical components 25 mounted thereon and thus electrically connected to the electronics 22 via the mated connectors 26,54 (pins/sockets) via corresponding conductive pathway(s) 43. As shown, the first substrate 28 can have a plurality of apertures 28*b* corresponding in spatial distribution with the spatial distribution of holes 34*b* of the textile substrate 34 (see FIG. 4). The apertures 28*b* are also matching in spatial distribution with a series of apertures 30*b* of a surface 30*a* of the second substrate 30 (e.g. a PCB). In assembly of the overall assembly 10, the first substrate 28 can be mounted on a corresponding surface 34*a* of the textile substrate 34 by an adhesive layer A. In assembly of the overall assembly 10, the second substrate 30 can be mounted on a corresponding opposing surface 34*a* of the textile substrate 34 by a similar adhesive layer A.

Figure 3:
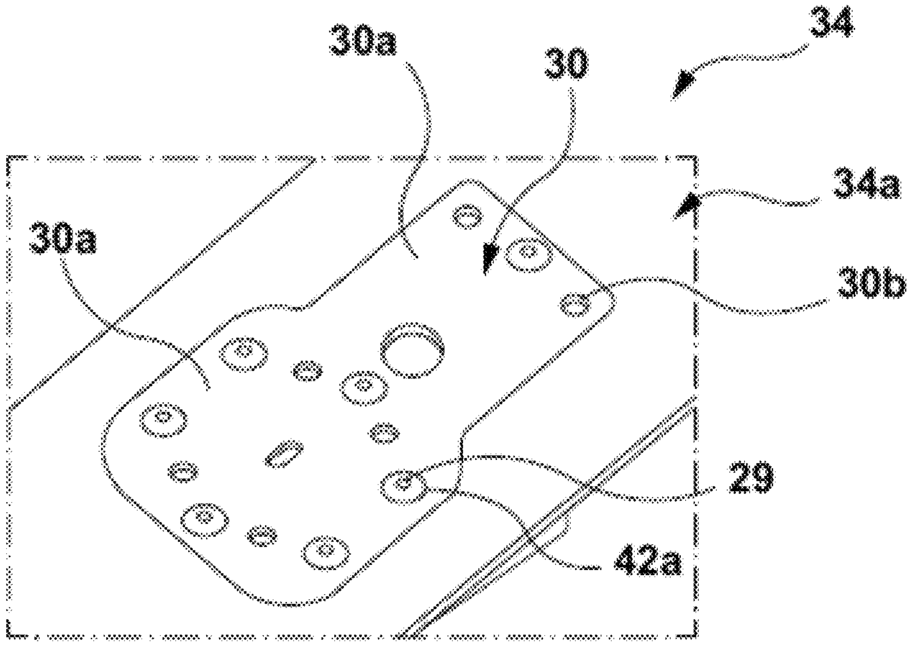
FIG. 3 illustrates a perspective view of a substrate component of the electronic textile system of FIG. 1, in accordance with another example embodiment of the present application.

Referring to FIG. 3, the second substrate 30 is mounted on an opposite surface 34*a* of the textile substrate 34 to that used to mount the first substrate 28, such that the textile substrate 34 is securely fastened between the substrates 28, 30, as further described below. The second substrate 30 also has connection locations 42*a* corresponding to the electrical connection locations 42, such that corresponding mechanical fasteners 29 (e.g. rivets—see FIG. 2) can be used to mechanically fasten the first substrate 28 to the second substrate 30, thus fixedly sandwiching/mounting the textile substrate 34 there-between).

Figure 5:
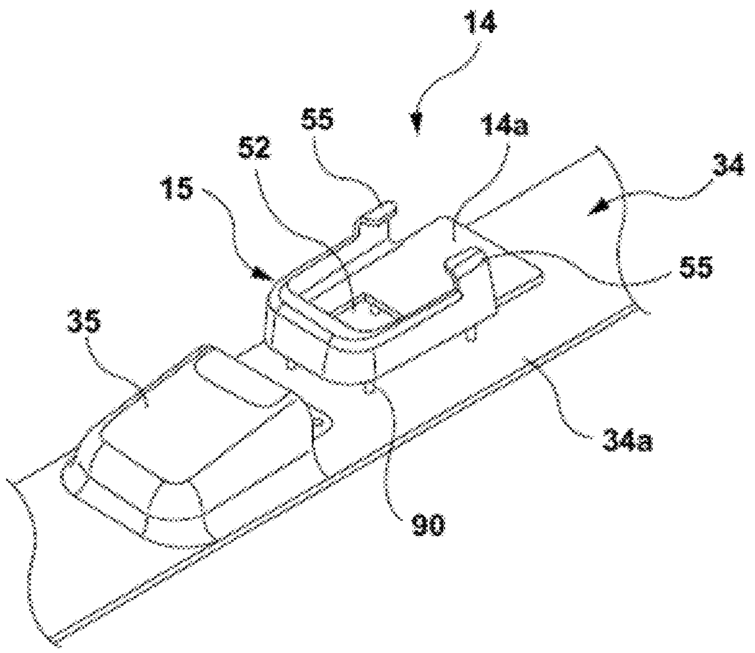
FIG. 5 illustrates a perspective view of a dock station body of FIG. 1 in relation to the textile substrate of FIG. 1.

Referring again to FIG. 4, an optional pocket 35 of the textile substrate 34 can be used to house the first substrate 28, as desired. As can be seen in FIG. 5, the optional pocket 35 can also be used to house the module dock station 14, when fastened to the first substrate 28 (further described below). Referring again to FIG. 1, the second substrate 30 can be covered by an optional backing 32 (e.g. fabric, plastic, padding, laminate, etc.) material, so as to provide for comfort of the wearer of the textile substrate 34 (e.g. as incorporated into a garment), when the backing 32 material is in contact with a skin of the wearer. The overall assembly 10 can also include a light pipe 16 (for indicating functional status of the electronics 22 via one or more visual indicators (e.g. LEDs) as well as a positioned magnet 20 in the interior 86 of the housing 18,24. In summary, the housing 18,24 of the controller device 12, once assembled, can be releasably secured, both mechanically and electrically, with the module dock station 14. The module dock station 14 is fixedly attached to the first substrate 28, which is in term fixedly attached to the textile substrate 34 via the mechanical (e.g. fasteners)/chemical (e.g. adhesive) connection between the first substrate 28 and the second substrate 30 when positioned on opposed sides 34*a* of the textile substrate 34.

Figure 9:
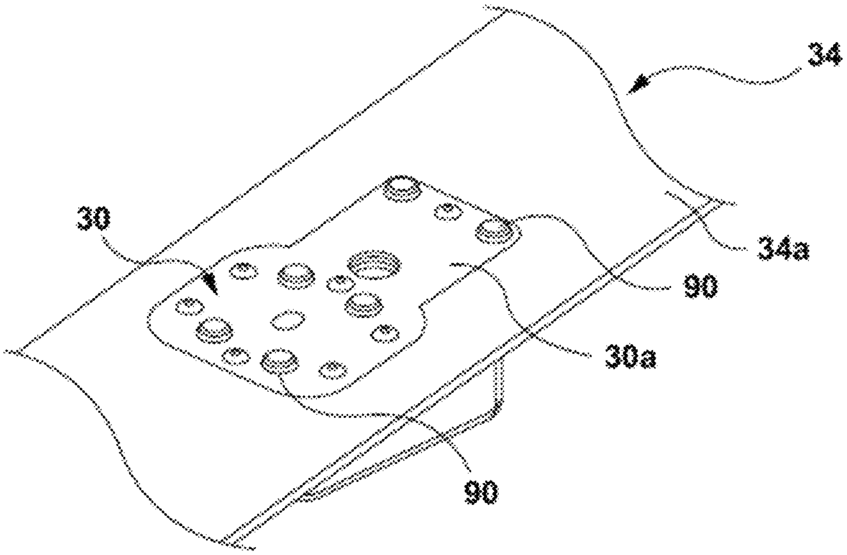
FIGS. 9, 10, and 11 provide views of the substrate component of FIG. 3 in relation to the textile substrate of FIG. 1.
Figure 15:
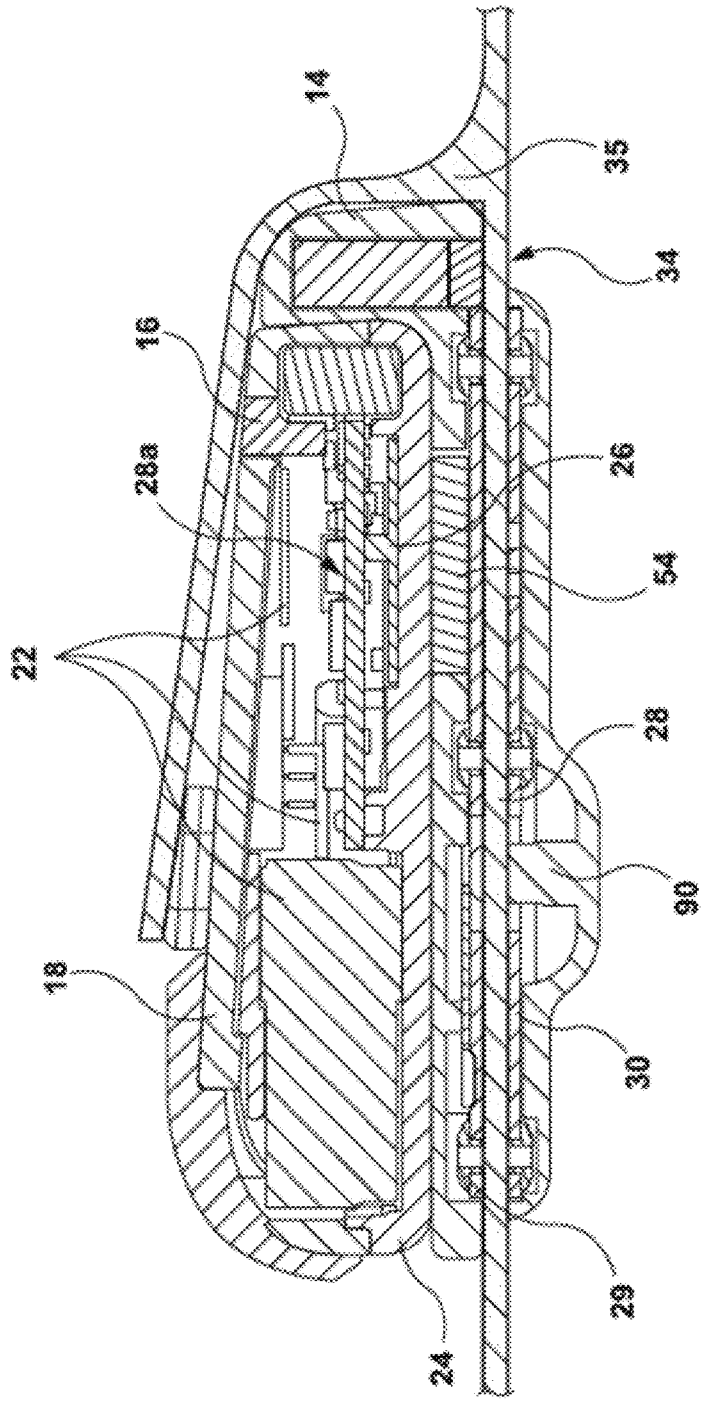
FIG. 15 illustrates a cross-sectional view of the overall assembly of FIG. 1 after assembly.

Referring again to FIGS. 2, 3, 4, the apertures 28*b*, 30*b* and holes 34*b* can be used to fasten the module docking station 14 with the substrate(s) 28,30 to one another, thus fixedly securing the module docking station 14 to the textile substrate 34. For example, one fastening method of the module docking station 14 with the substrate(s) 28,30 can be using a staking method (see FIGS. 5, 9, 15), whereby staking is the process of connecting the two components (the module docking station 14 with the substrate(s) 28,30) by creating an interference fit of a fastener 90 between the two pieces (the module docking station 14 with the substrate(s) 28,30). One workpiece 28,30 has a hole 28*b*, 30*b* in it while the other (the module docking station 14) has a boss 90 that fits within the hole 28*b*, 30*b*. It is recognized that one of the workpieces 28, 30 can have the respective hole(s) 28*b*, 30*b* while the other of the pieces (the module docking station 14) can have the fastener(s) 90 mounted on the corresponding surface 28*a*, 30*a*. The fastener 90 (e.g. boss) can be very slightly undersized so that it forms a slip fit with the hole 28*b*, 30*b*. A staking punch can then be used to expand the boss 90 radially and to compress the boss 90 axially so as to form an interference fit between the workpieces (the module docking station 14 with the substrate(s) 28,30). This interference fit forms a permanent join(s)/connection(s) between the two pieces, such that the interposed textile substrate 34 is fixedly secured between the two substrates 28,30 which in turn is fastened to the module docking station 14 via the staking. The staking process can also be referred to as thermoplastic staking, also known as heat staking, which is the same process except that it uses heat to deform the plastic boss 90, instead of cold forming. A plastic stud 90 protruding from one component fits into a hole in the second component. The stud 90 is then deformed through the softening of the plastic to form a head which mechanically locks the two components (the module docking station 14 with the substrate(s) 28,30) together. Unlike welding techniques, staking has the capacity to join plastics to other materials (e.g. metal, PCB's) in addition to joining like or dissimilar plastics, and it has the advantage over other mechanical joining methods in reducing the need for consumables such as rivets and screws.

Figure 10:
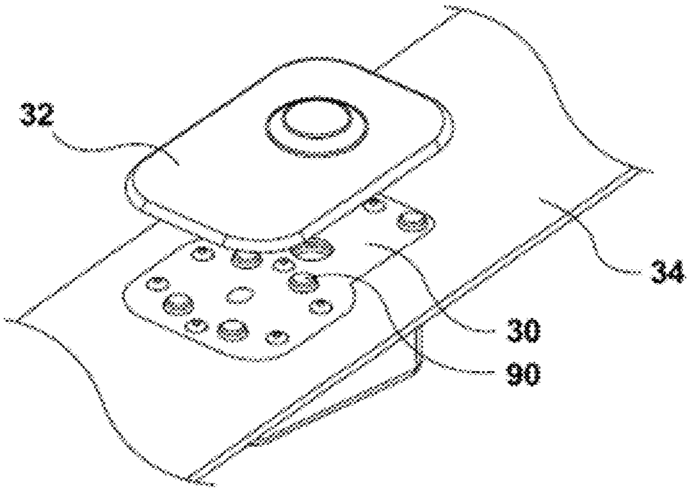
Figure 11:
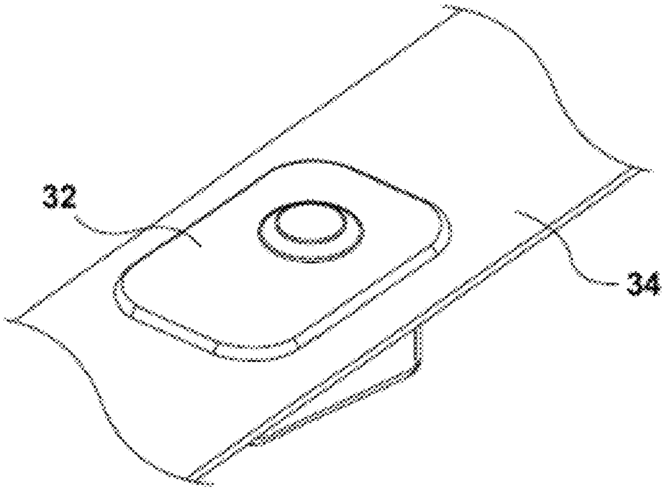
Figure 12:
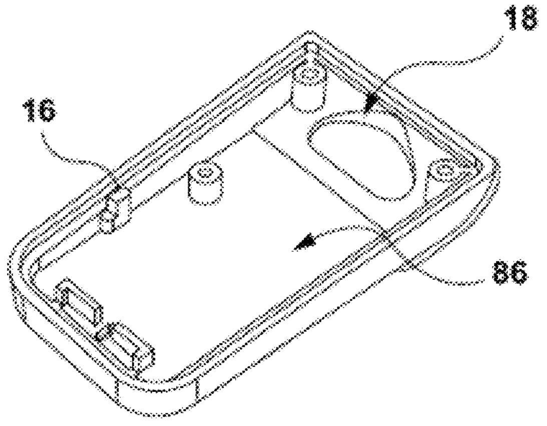
FIGS. 12, 13, and 14 provide views of the controller device of FIG. 1 in assembled and unassembled form.
Figure 13:
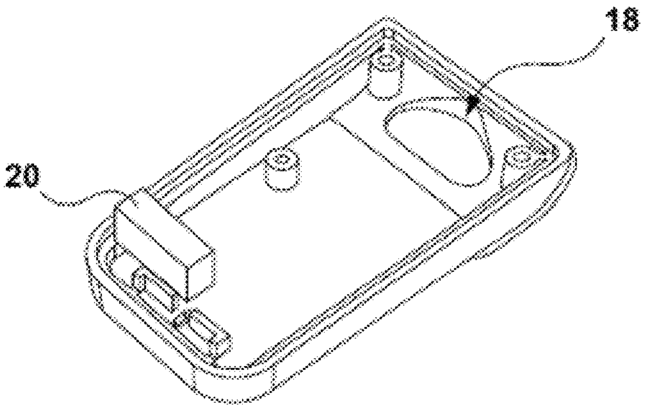
Figure 14:
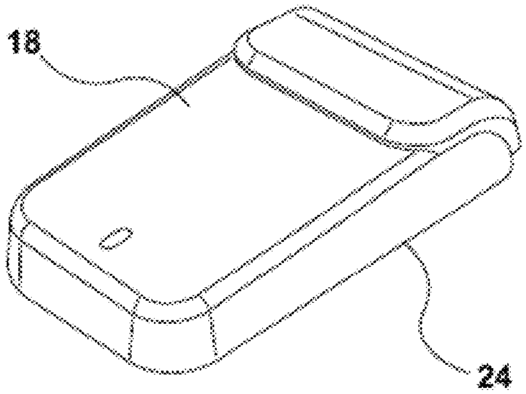
Figure 16:
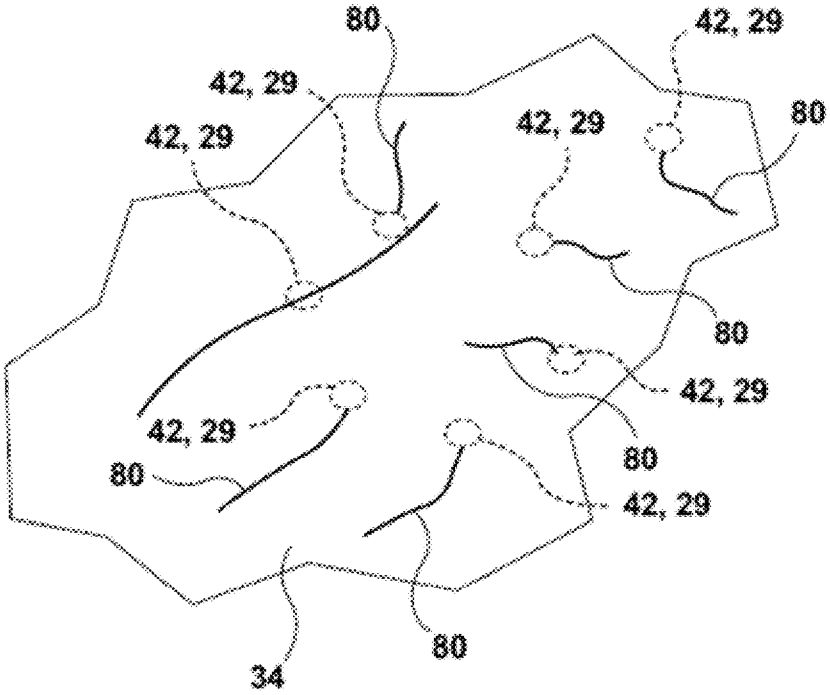
FIG. 16 is an example view of the textile substrate of FIG. 1, including conductive pathways.

Referring to FIGS. 10 and 11, shown is an example backing 32 in order to cover the second substrate 30 after being fastened to the first substrate 28. Referring to FIGS. 12, 13, 14, shown is the housing 18,24 in an unassembled and assembled form, such that the interior 86 with mounted light pipe 16 and magnet 20 are shown by example. Referring to FIG. 16, shown is a cross sectional view of the overall assembly 10, including an optional piezo sensor mounted between the first substrate 28 and the body 14*a* of the module dock station 14.

Referring to FIG. 16, shown is an example textile substrate 34 with the conductive pathways 80, as an illustration only, with the locations of the electrical connector locations 42 (and/or fasteners 29) of FIG. 2 in ghosted view. It is recognized that an electrical connection between the electrical connector locations 42 and the conductive pathways 80 is fixed when the electrical connector locations 42 (of the first substrate 28) come into contact with the conductive pathways 80, which is maintained due to 1) the fixed connection (e.g. via fasteners 90) between the substrates 28,30 thus sandwiching the textile substrate 34 there between and biasing the electrical connectors locations 42 and the conductive pathways 80 into physical contact with one another; and/or 2) the connection via the fasteners 29 (e.g. conductive fasteners such as metal rivets, pins, etc.) between the substrates 28,30 as the fasteners 29 are in physical contact with the electrical pathways 80 as well as the electrical connector locations 42. The substrates 28,30 can be made of flexible or rigid material, as desired, so long as the material retains the interconnection between the locations 42 by the fasteners 29.

For example, electrical current to the electronics 22 follows the electrically conductive path of: a) from the conductive pathways 76 to b) the electrical controller connector 26 to c) the electrical dock connector 54 to d) the conductive pathways 43 connecting each of the one or more electrical connectors 79*b* (e.g. pins, sockets, etc.) of the electrical dock connector 54 to e) corresponding one or more electrical connection locations 42 to finally f) (e.g. via the fasteners 29) positioned adjacent to and electrically bonded to the conductive pathways 80 of the textile substrate 34. Similarly, electrical current from the conductive pathways 80 of the textile substrate 34 follows the electrically conductive path of: a) (e.g. via the fasteners 29) positioned adjacent to and electrically bonded to the conductive pathways 80 of the textile substrate 34 to b) corresponding one or more electrical connection locations 42 to c) the conductive pathways 43 connecting each of the one or more electrical connectors 79*b* (e.g. pins, sockets, etc.) of the electrical dock connector 54 to d) the electrical dock connector 54 to e) the electrical controller connector 26 to f) the conductive pathways 76 connected to the electronics 22.

Figure 17:
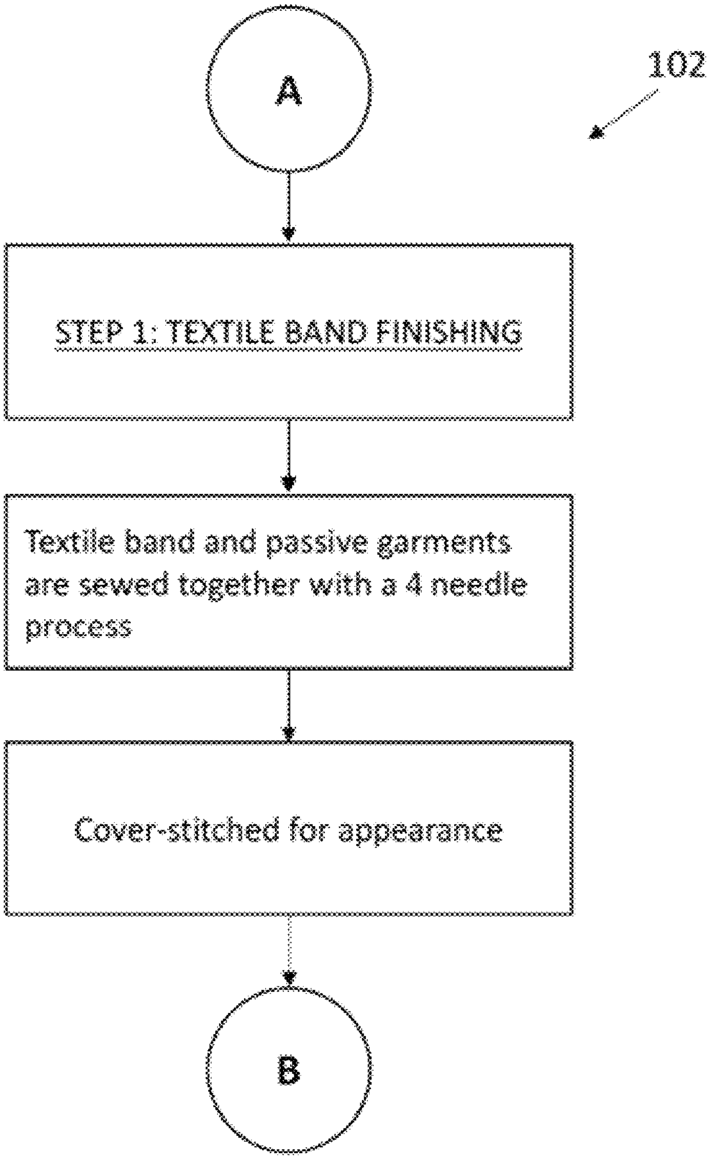
FIGS. 17 to 21 are example flowcharts of assembly methods for the overall assembly of FIG. 1.
Figure 18:
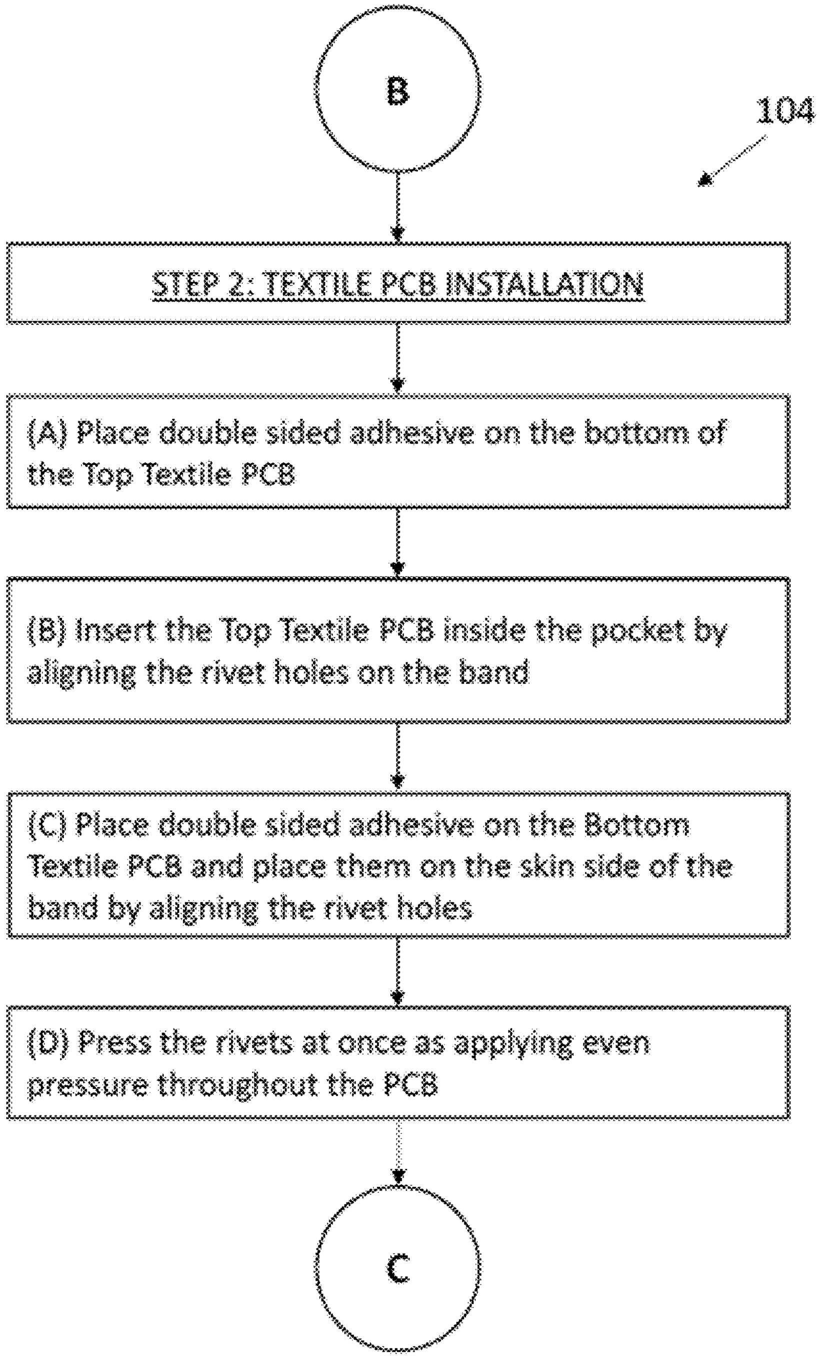
Figure 19:
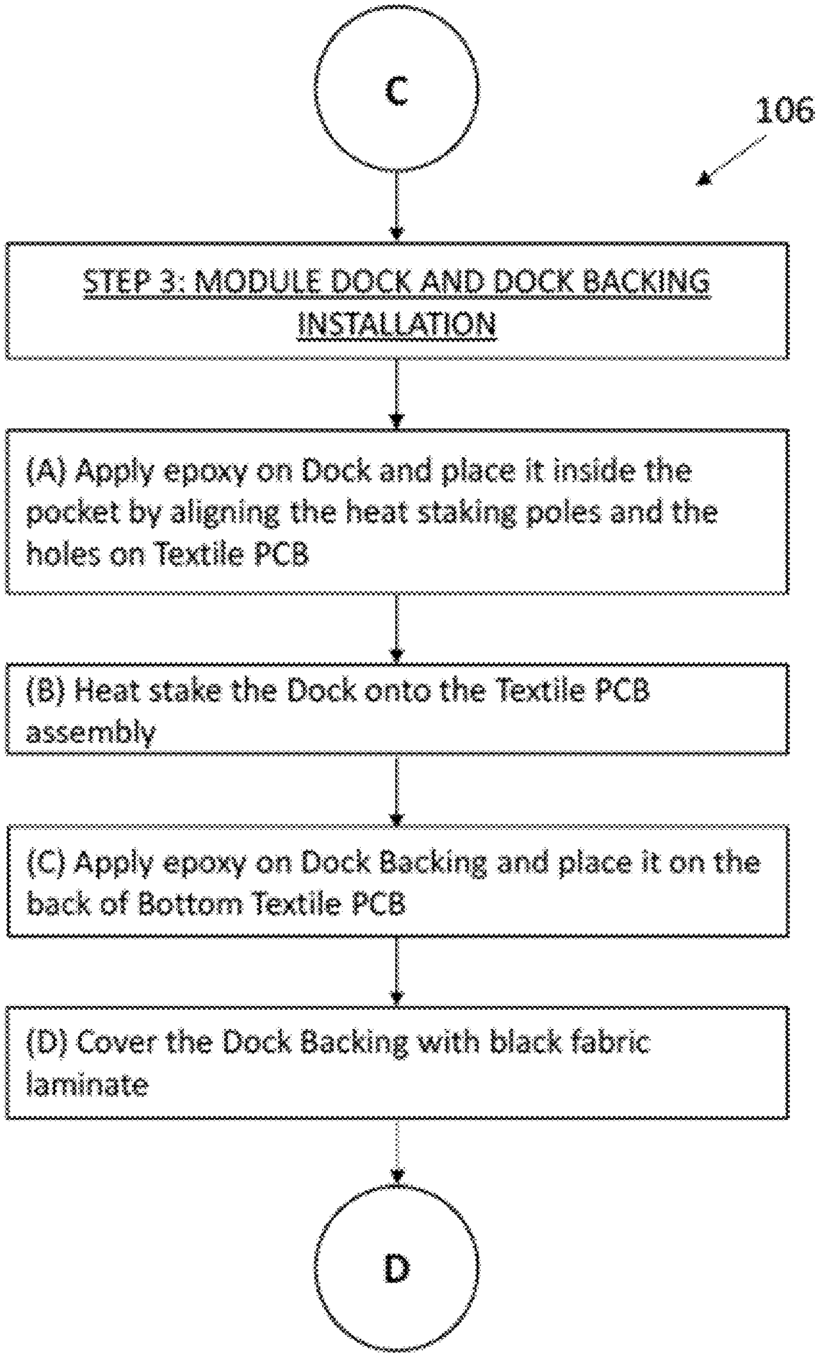
Figure 20:
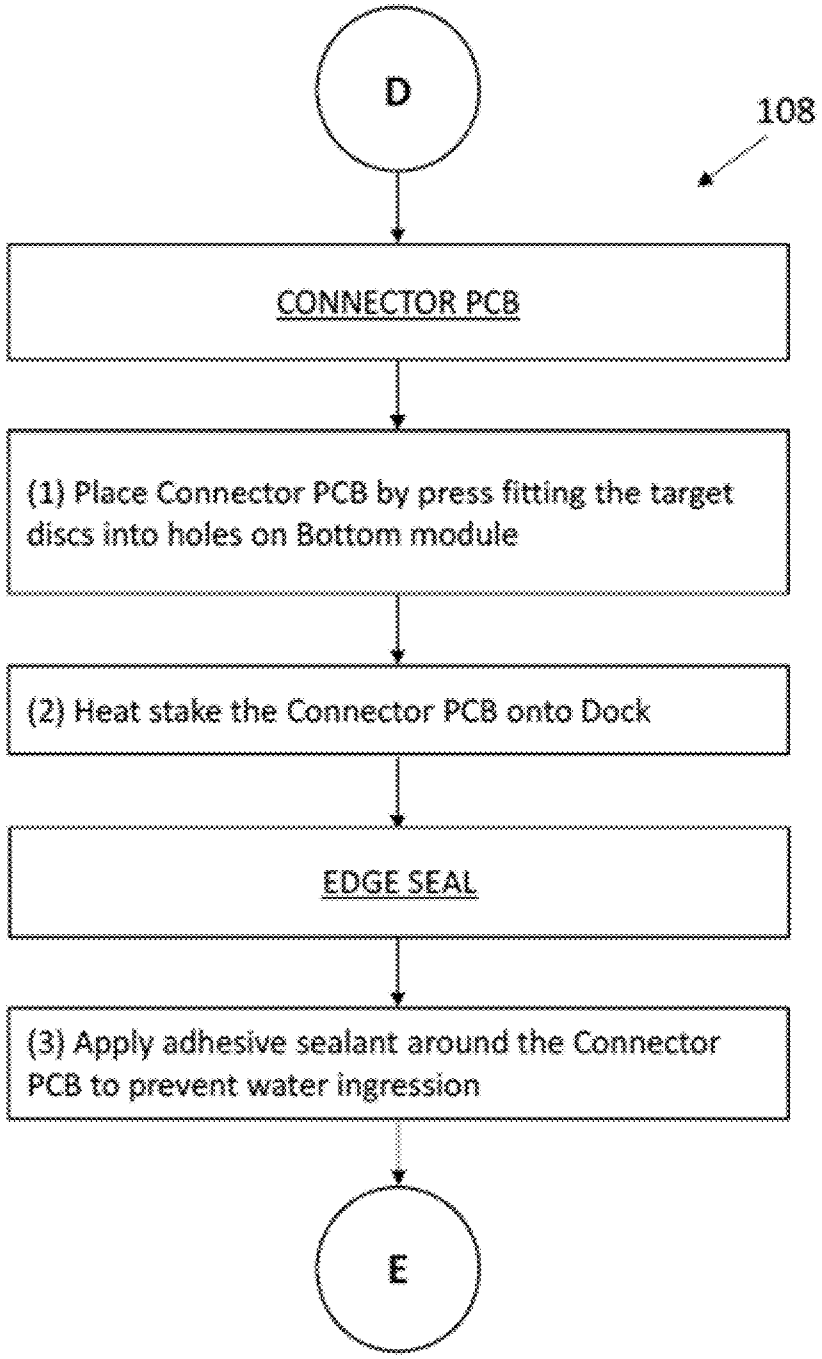
Figure 21:
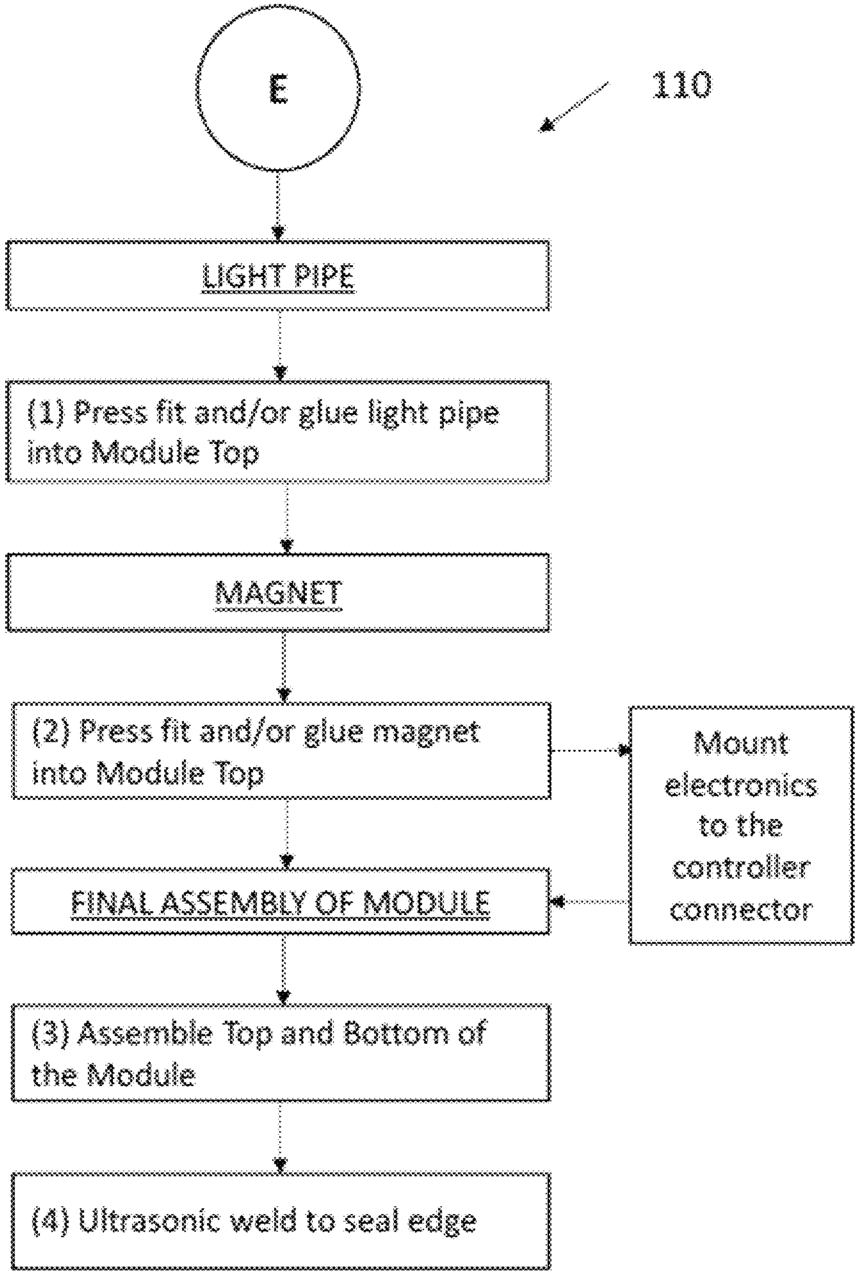

In fabrication of the overall assembly 10, the following example manufacturing processes can be performed. FIG. 17 shows an example process 102 for manufacture of the textile substrate 34 including the conductive pathways 80 (e.g. circuits containing conductive wires/fibres with attached sensors/actuators applied on or otherwise interlaced, knit/woven, with the fibres of the textile substrate 34). FIG. 18 shows an example method steps 104 to manufacture the sandwich of the two substrates 28,30 with the textile substrate 34. Referring to FIG. 19, shown is a method 106 to fasten (e.g. mechanical) the module docking station 14 to the first substrate 28 underlying and adjacent to the module docking station 14. Further, the backing 32 is fastened (e.g. adhesive) to the second substrate 30 underlying and adjacent to the backing 32. FIG. 20 is an example manufacture 108 of the electrical controller connector 26 onto the housing 18,24 of the controller device 12. FIG. 21 is a method of manufacture 110 for the main controller device 12, including mounting of the components 16, 20, 22 within the interior 86 of the housing 18,24 and sealing the housing 18,24.

As shown above by example, the overall assembly 10 included the controller device 12, the module dock station 14 fixedly connected to the substrate(s) 28,30, and the substrates 28,30 fixedly connected to the textile substrate 34 (having the plurality of conductive pathways 80). As such, the controller device 12, once assembled, is both mechanically and electrically releasably securable to the module dock station 14, in order to effect electrical communication between the electronics 22 of the controller device 12 and the conductive pathways 80 of the textile substrate 34.

Accordingly, described by example only is: (a) light pipe 16, (b) top enclosure 18, (b) magnet 20, (c) main electronics 22 which can contain (d) the main PCB 28, (e) battery 70 and (f) other electronic components 72,74,76, (g) bottom enclosure 24, which holds (h) the connector PCB 26, (i) module dock 14, (j) top textile PCB 28 which are located above the (j) textile band 34 and under the (k) textile pocket 35 and the (l) bottom textile PCB 30 and (m) fabric and laminate padding 32, which are located below the textile band 34.

Further, the embodiments comprise apparatus and methods to make a reliable interconnection between electronic devices 12 and smart textiles 34. The embodiments facilitate the electronic device 12 to maintain a robust electrical connection to electrically conductive circuits 80 on the smart textile 34 while also being securely mechanically fastened to the smart textile 34, thus acquiring the ability to withstand mechanical shock, torsion, stretch and other stresses to which the smart textile 34 or electronic devices 12 may be subject to.

In some embodiments the textile band 34 or textile substrate 34 may contain no electrical or electronic components. In some embodiments, the textile substrate 34 may contain only electrically conductive circuits 80, such as electrically conductive yarn, fiber or printed electronic circuits. In other embodiments, the textile substrate 34 may contain fully functional and active electronic components, sensors, circuits and the like.

For the purposes of a wearable smart textile 34 worn on the body, the direction of below the textile band 34 would be interpreted as being closer to the body and above the textile band 34 would be farther away from the body. The textile pocket 35 is preferably a structure which is raised above the textile band 34 and fabricated by knitting into the textile band 34 knit structure.

In some embodiments, the textile substrate 34 (also called the textile band 34) has successfully incorporated health monitoring sensors in the form of ECG sensor pads, respiratory monitoring sensors and bio-impedance monitoring sensors. These sensors are electrically connected to conductive circuits 80 within the textile band 34, which are then connected using rivets 29, eyelet or grommets 42 leading to the hard electronics 22 (e.g. mounted on the PCB 78). In other embodiments, the main electronics PCB 78 has also successfully incorporated motion sensors and temperature sensors onto the module PCB 78, as part of the electronics 22.

FIG. 17 illustrates embodiment comprising textile form factors to which the textile substrate 34 has been successfully applied, including: underwear, bra and shirts. It can be appreciated that the embodiments are applicable to any form of textile substrate 34 or flexible substrate 34 exhibiting similar properties to a textile or fabric.

FIG. 18 illustrates the steps relating to assembling the top textile PCB 28 onto the textile band 34 with this embodiment comprising steps, including: (1) Placing an adhesive material A on the bottom side of the top textile PCB 28, (2) Inserting the top textile PCB 28 inside the textile pocket 35 by aligning the holes 42 on the top textile PCB 28 to the matching pre-punched rivet holes 34*b* onto the textile band 34, (3) Placing double-sided adhesive A on the bottom textile PCB 30 and placing it on the opposite side 34*a* of the textile band 34 to the top textile PCB 28, also aligning to the pre-punched rivet holes 34*b* in the textile band 34, and (4) Pressing the rivets 29 at the same time as applying even pressure to the PCBs 28,30.

Steps 1-4, above, create a robust and secure mechanical and electrical connection between the top textile PCB 28, the bottom textile PCB 30 and the textile band 34. In regions where an electrical connection is required, the pre-punched rivet holes 34*b* in the textile band 34 can be located such that an electrical conductive circuit 80 in the textile band 34 is physically in contact with the metal rivet 29 an/or the conductive locations 42 (e.g. part of the conductive pathways 43 positioned on the underside of the first substrate 28 (and thus able to be placed into direct contact with the surface 34*a* of the textile substrate 34). It should be noted that rivet 29 can also mean eyelet, grommet or similar type of metal fastening method.

The textile band pocket 35, which is fabricated in such a manner as to be raised above the surface 34*a* of the textile band 34 facilitating just enough room for the module dock housing 50 to fit snugly within the pocket 35, while also facilitating it to be removed when necessary.

FIG. 19 illustrates the steps 106 relating to assembling the module dock 14 and dock backing 32 into the textile band 34, with this embodiment comprising steps, including: (1) Applying epoxy to the dock 14 and placing it inside the pocket 35 by aligning the heat stacking poles 90 to the holes 28*b*, 30*b* on the textile PCBs 28,30, (2) Heat staking the dock 14 onto the textile PCB 28,30,34 assembly, (3) Applying epoxy to the dock backing 32 and placing it on the back of the bottom textile PCB 30, and, (4) Covering the dock backing 32 with a fabric, preferably laminated.

FIG. 20 illustrates the steps 108 relating to assembling the connector PCB 26 into the bottom module enclosure 24 with this embodiment comprising the steps of: (1) placing and press-fitting the connector PCB target discs 26 into the bottom module holes 79*a*, (3) heat staking the connector PCB 26 onto the dock body 14*a*, (4) applying adhesive sealant around the connector PCB 26 to prevent water ingression between the body 14*a* and the connector 26.

FIG. 21 illustrates the steps 110 relating to assembling the light pipe 16 and magnet 20 and corresponding electronics 22 into the module top enclosure 18 and assembling the top 18 and bottom 24 module enclosures together with this embodiment comprising the steps of: (1) Press fitting and/or gluing the light pipe 16 into Module Top 18, (2) Press fitting and/or gluing the magnet 20 into Module Top 18 as well as connecting the electronics 22 (e.g. via the PCB 78 together with the connector 26) in order to electrically connect the conductive pathways 76 of the electronics 22 with the connectors of the connector 26), (3) Assembling the Top 18 and Bottom 24 of the Module 12 together, and (4) Ultrasonically welding to seal the edges of the top 18 and bottom 24 module.

Other options for manufacture can include generally processes such as but not limited to:

1) the process of assembly comprises the steps of: assembling the top textile PCB onto the textile band; placing an adhesive material on the bottom size of the top textile PCB; inserting the top textile PCB inside the textile pocket by aligning the holes on the top textile PCB to the matching pre-punched rivet holes onto the textile band; placing double-sided adhesive on the bottom textile PCB and placing it on the opposite side of the textile band to the top textile PCB, also aligning to the pre-punched rivet holes in the textile band; and pressing the rivets at the same time as applying even pressure to the PCBs;
2) in regions where an electrical connection is needed, the pre-punched rivet holes in the textile band can be located such that an electrical conductive circuit in the textile band is physically in contact with the metal rivet;
3) the textile band pocket can be fabricated in such a manner as to be raised above the surface of the textile band providing just enough room for the module dock housing to fit snugly within the pocket, while also allowing it to be removed when used;
4) assembling the module dock and dock backing into the textile band; applying epoxy to the dock and placing it inside the pocket by aligning the heat stacking poles to the holes on the textile PCBs; heat staking the dock onto the textile PCB assembly; applying epoxy to the dock backing and placing it on the back of the bottom textile PCB; and covering the dock backing with a fabric, preferably laminated;
5) assembling the connector PCB into the bottom module enclosure; placing and press-fitting the connector PCB target discs into the bottom module holes; heat staking the connector PCB onto the dock; and applying adhesive sealant around the connector PCB to prevent water ingression; and/or
6) assembling the light pipe and magnet into the module top enclosure and assembling the top and bottom module enclosures together; press fitting and/or gluing the light pipe into Module Top; press fitting and/or gluing the magnet into Module Top; assembling the Top and Bottom of the Module together; and ultrasonically welding to seal the edges of the top and bottom module.

Figure 22:
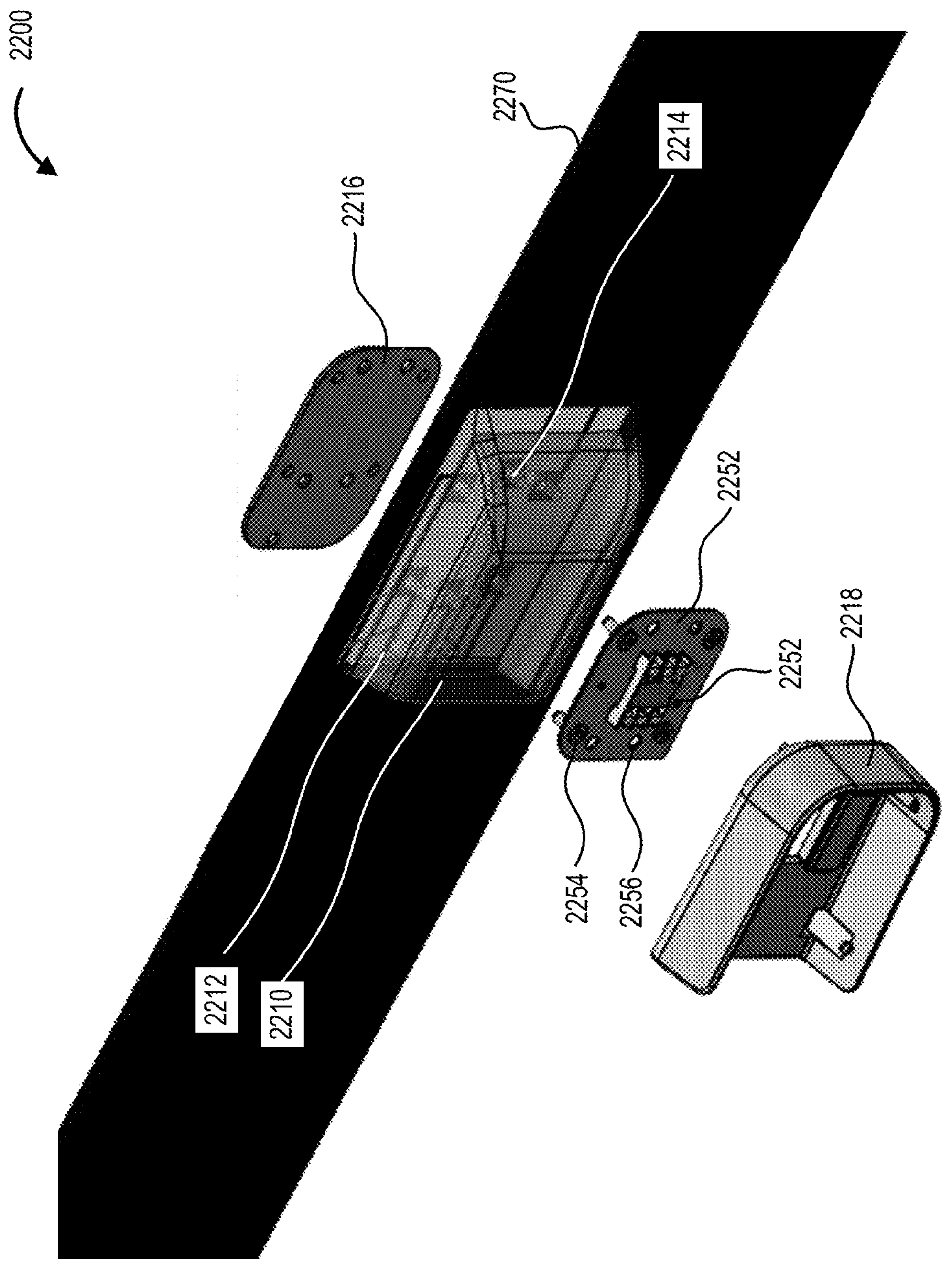
FIG. 22 illustrates a partially exploded view of a textile interconnection system, in accordance with another embodiment of the present application.

Reference is made to FIG. 22, which illustrates a partially exploded view of a textile interconnection system 2200, in accordance with embodiments of the present application. The textile interconnection system 2200 includes a textile receptacle 2210 coupled to a portion of a textile substrate 2270 and a textile docking device 2250 received within the textile receptacle 2210.

The textile interconnection system 2200 may be configured to receive a controller device (not illustrated in FIG. 22). The controller device may be a computing device that may be removably received by the textile interconnection system 2200 and may be configured to transmit data to or receive data from electronic components interconnected with or embedded in the textile substrate 2270.

In some embodiments, the textile substrate 2270 may be a portion of a smart garment. In some embodiments, the smart garment may be formed of a knitted textile. In some other embodiments, the smart garment may be formed of other textile forms and/or techniques such as weaving, knitting (warp, weft, etc.) or the like. In some embodiments, the smart garment may include one of a knitted textile, a woven textile, a cut and sewn textile, a knitted fabric, a non-knitted fabric, in any combination and/or permutation thereof. Example structures and interlacing techniques of textiles formed by knitting and weaving are disclosed in U.S. patent application Ser. No. 15/267,818, the entire contents of which are herein incorporated by reference.

As used herein, “textile” refers to any material made or formed by manipulating natural or artificial fibres to interlace to create an organized network of fibres. Generally, textiles are formed using yarn, where yarn refers to a long continuous length of a plurality of fibres that have been interlocked (i.e. fitting into each other, as if twined together, or twisted together). Herein, the terms fibre and yarn may be used interchangeably. Fibres or yarns can be manipulated to form a textile according to any method that provides an interlaced organized network of fibres, including but not limited to weaving, knitting, sew and cut, crocheting, knotting and felting.

Different sections of a textile can be integrally formed into a layer to utilize different structural properties of different types of fibres. For example, conductive fibres can be manipulated to form networks of conductive fibres and non-conductive fibres can be manipulated to form networks of non-conductive fibers. These networks of fibres can comprise different sections of a textile by integrating the networks of fibres into a layer of the textile. The networks of conductive fibres can form one or more conductive pathways that can electrically connect sensors and actuators embedded in the smart garment for conveying data and/or power to and/or from these components.

In some embodiments described in the present application, the textile substrate 2270 may be configured as a network of conductive fibres for conveying data and/or power between the one or more sensor, actuators, devices, or combinations thereof.

In some embodiments, multiple layers of textile may be stacked upon each other to provide a multi-layer textile.

In the present application, "interlace" refers to fibres (either artificial or natural) crossing over and/or under one another in an organized fashion, typically alternately over and under one another, in a layer. When interlaced, adjacent fibres touch each other at intersection points (e.g. points where one fibre crosses over or under another fibre). In one example, first fibres extending in a first direction can be interlaced with second fibres extending laterally or transverse to the fibres extending in the first connection. In another example, the second fibres can extend laterally at 90° from the first fibres when interlaced with the first fibres. Interlaced fibres extending in a sheet can be referred to as a network of fibres.

In the present application, "integrated" or "integrally" refers to combining, coordinating or otherwise bringing together separate elements so as to provide a harmonious, consistent, interrelated whole. In the context of a textile, the textile can have various sections comprising networks of fibres with different structural properties. For example, a textile can have a section comprising a network of conductive fibres and a section comprising a network of non-conductive fibres. Two or more sections comprising networks of fibres are said to be "integrated" together into a textile (or "integrally formed") when at least one fibre of one network is interlaced with at least one fibre of the other network such that the two networks form a layer of the textile. Further, when integrated, two sections of a textile can also be described as being substantially inseparable from the textile. Here, "substantially inseparable" refers to the notion that separation of the sections of the textile from each other results in disassembly or destruction of the textile itself.

In some examples, conductive fabric (e.g. group of conductive fibres can be knit along with (e.g. to be integral with) the base fabric (e.g. surface) in a layer. Such knitting may be performed using a circular knit machine or a flatbed knit machine, or the like, from a vendor such as Santoni or Stoll.

As described, the textile interconnection system 2200 includes the textile receptacle 2210 coupled to the textile substrate 2270. In some examples, the textile substrate 2270 may include one or more conductive or non-conductive fibers for transmitting/receiving data signals or power signals between the controller device received within the textile receptacle 2210 and one or more sensors, actuators, or components coupled to the textile substrate 2270.

The textile receptacle 2210 may project from the portion of the textile substrate 2270 to form a cavity for receiving the controller device. In some embodiments, the textile receptacle 2210 may project from the portion of the textile substrate 2270 to form a pocket-like cavity for receiving the controller device. The textile docking device 2250 may be received within the textile receptacle 2210 and may be configured as an electrical and/or mechanical interconnection interface between the controller device and the textile substrate 2270. For example, the textile docking device 2250 may be coupled to at least one conductive fibre of the textile substrate 2270 to provide an electrical interconnection with the at least one conductive fiber of the textile substrate 2270.

In some embodiments, the textile receptacle 2210 may include textile material that is substantially similar to the textile substrate 2270. As such, the textile receptacle 2210 may be an extension that projects or protrudes from a surface of the textile substrate 2270.

In some embodiments, when the textile receptacle 2210 receives the controller device, the textile receptacle 2210 may be configured as a mechanical encasing providing a physical barrier for the controller device from external elements such as moisture, physical disturbances, or other external environmental elements. For instance, the textile receptacle 2210 may include moisture-resistant material configured as a moisture barrier for the controller device received within the textile receptacle 2210 (e.g. pocket-like cavity).

In some embodiments, the portion of the textile substrate 2270 associated with the textile receptacle 2210 may be configured with traces or electrodes for integrating electronic hardware. For example, the portion of the textile substrate 2270 associated with the textile receptacle 2210 may include one or more conductive traces 2212 or conductive pads 2214. The conductive traces 2212 or conductive pads 2214 may be inlaid on the textile substrate 2270. The conductive traces 2212 or the conductive pads 2214 may be associated with the textile receptacle 2210. For instance, the conductive traces 2212 or the conductive pads 2214 may be positioned on a portion of the textile substrate 2270 and within or proximal the pocket-like cavity of the textile receptacle 2210.

The conductive pads 2214 may be positioned such that the conductive pads may interconnect or mate with electronic pads of the controller device, when the controller device is received within the textile receptacle 2210.

The conductive traces 2212 or conductive pads 2214 may be coupled to one or more conductive fibers of the textile substrate 2270, and the conductive traces 2212 or conductive pads 2214 may be configured to transmit/receive data signals or power signals between the textile substrate 2270 and the controller device received within the textile receptacle 2210.

In some embodiments, the conductive traces 2212 or the conductive pads 2214 may be coupled to a support board 2216. In some examples, the support board 2216 may be a printed circuit board.

In some embodiments, the portion of the textile substrate 2270 associated with the textile receptacle 2210 may include one or more mounting apertures. The mounting apertures may be configured to receive the textile docking device 2250. The textile docking device 2250 may be a printed circuit board for interfacing with the controller device received within the textile receptacle 2210.

In some embodiments, the textile substrate 2270 may be disposed between the textile docking device 2250 and the support board 2216. The support board 2216 may provide foundational support to the textile receptacle 2210. The conductive traces 2212 or conductive pads 2214 may be configured to interface the textile docking device 2250 and the textile substrate 2270. The conductive traces 2212 or conductive pads 2214 may be configured to transmit/receive power or data signals between the textile substrate 2270 and the textile docking device 2250.

In some embodiments, the textile docking device 2250 may be coupled to the textile substrate 2270 directly without the support circuit board 2216.

In some embodiments, the textile docking device 2250 may be configured as an electronic circuit (e.g. a printed circuit board including conductive pads) and one or more fastener components. The fastener components may include one or more grommets 2254 or one or more heat stake apertures 2256. The grommets 2254 or heat stake apertures 2256 may correspond to or align with apertures or other fastening features of the textile substrate 2270, and the textile docking device 2250 may be coupled within the textile receptacle 2210 via one or more grommets 2254 or heat stake apertures 2256.

The textile docking device 2250 may include one or more circuit connection pads 2252 substantially aligning with conductive traces 2212 or conductive pads 2214 positioned proximal or within the pocket-like cavity of the textile receptacle 2210.

In some embodiments, the textile interconnection system 2200 may include a housing 2218 received within the textile receptacle 2210. The housing 2218 may be configured to provide a substantially structured frame for the textile receptacle 2210, and the controller device may be mechanically received within the housing 2218. In some embodiments, the housing 2218 may be configured to provide a mechanical interconnection between the received controller device and the textile substrate 2270.

In some embodiments, the textile docking device 2250 may be coupled or combined with the housing 2218, and collectively may electrically and/or mechanically receive the controller device within the textile receptacle 2210.

In some embodiments, the one or more grommets 2254 may be pressed or crimped, and pins (e.g. plastic pins) from the housing 2218 may align the textile docking device 2250, the conductive traces 2212/conductive pads 2214, and the support circuit board 2216. In some embodiments, one or more heat stakes may be inserted within one or more heat stake apertures 2256 to provide mechanical support for components of the textile interconnection system 2200.

As described in the present application, the textile receptacle 2210 may receive a controller device. The controller device may be mechanically interconnected to the textile substrate 2270 by the housing 2218 and may be electronically interconnected to the textile substrate 2270 by the textile docking device 2250. The controller device may be configured as a power supply, a power receiver/storage device, a data communication bus, a sensor platform/device, an actuator platform/device, or a combination of any of the foregoing, among other devices.

In some embodiments, the housing 2218 may include a magnet, positioned within the textile receptacle 2210. When the controller device is received within the textile receptacle 2210, including the housing 2218, the magnet (not illustrated in FIG. 22) may be configured to exert a magnetic attractive force for retaining the controller device within the textile receptacle 2210. In some embodiments, the magnet may include a first polarity. When the controller device is received within the textile receptacle 2210, the controller device may include a magnet having a second, opposing polarity to the first polarity. The controller device may be retained within the textile receptacle 2210 based on the attractive magnetic force provided by opposing magnetic poles.

As illustrated in embodiments described in the present application, the textile interconnection system 2200 may provide interconnections between the controller device and the textile substrate 2270 for sharing power or electronic data communications. As sensor devices, actuator devices, or other electronic devices integrated throughout the textile substrate 2270 may require power signals or data signals to interoperate with one or more devices connected via a network of the textile substrate 2270, the textile interconnection system 2200 may be configured to interconnect electronic devices disparately located in the power/data network provided by the textile substrate 2270. For example, the textile substrate 2270 may provide a plurality of disparately located sensors for obtaining physiological data (e.g. measuring impedance on surface of user skin, etc.) from a plurality of locations on a user's body. The textile interconnection system 2200 may provide an electrical and/or mechanical interconnection among the disparately located sensors or controller devices for collecting physiological data collected from the disparately located sensors.

In some embodiments, the textile receptacle 2210 may include electronic devices configured to provide intermediary communications. For example, the textile receptacle 2210 may include electronic devices configured as a data messaging hub or data messaging bus for coordinating data packet transmissions across conductive traces 2212 (e.g. a communication network). In some embodiments, the textile receptacle 2210 or the textile docking device 2250 may include data clock generation devices for generating data clock signals to synchronize data acquisition or data transfer operation. The data clock generation devices may be configured to provide reference timing signals.

Figure 23:
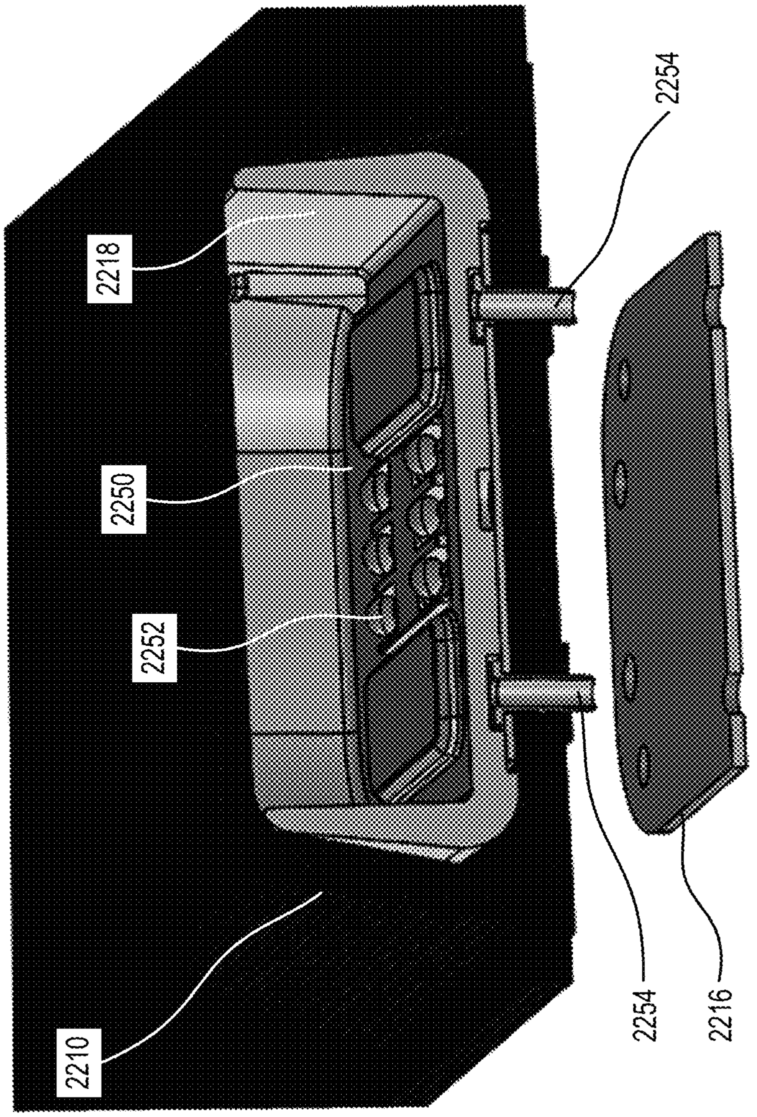
FIG. 23 illustrates a cross sectional view of the textile interconnection system of FIG. 22.

Reference is made to FIG. 23, which illustrates a cross sectional view of the textile interconnection system 2200 illustrated in FIG. 22. The textile docking device 2250 may be combined with the housing 2218 and collectively may electrically and/or mechanically receive a controller device within the textile receptacle. When received within the textile receptacle 2210, the housing 2218 may provide a substantially structured frame for the textile receptacle 2210.

In some embodiments, the one or more grommets 2254 may be constructed of conductive material, and may conductive electrical signals to/from the support circuit board 2216. In some embodiments, the one or more grommets 2254 may be configured to provide a vertical interconnect access (VIA) of a printed circuit board. In some embodiments, the one or more grommets 2254 may be configured as a vertical interconnect access to electrically interconnect the textile docking device 2250 and the support board 2216. In some embodiments, the one or more grommets 2254 may be electrical ground paths for the textile docking device 2250. In some embodiments, the one or more grommets 2254 may align with apertures or other fastening features of the textile substrate 2270. In some embodiments, the one or more grommets 2254 may be configured as a mechanical fastener or be configured as mechanical support.

In some embodiments, the textile receptacle 2210 may be an extension of the textile substrate 2270. The textile receptacle 2210 may project or protrude from a surface of the textile substrate 2270.

Figure 24:
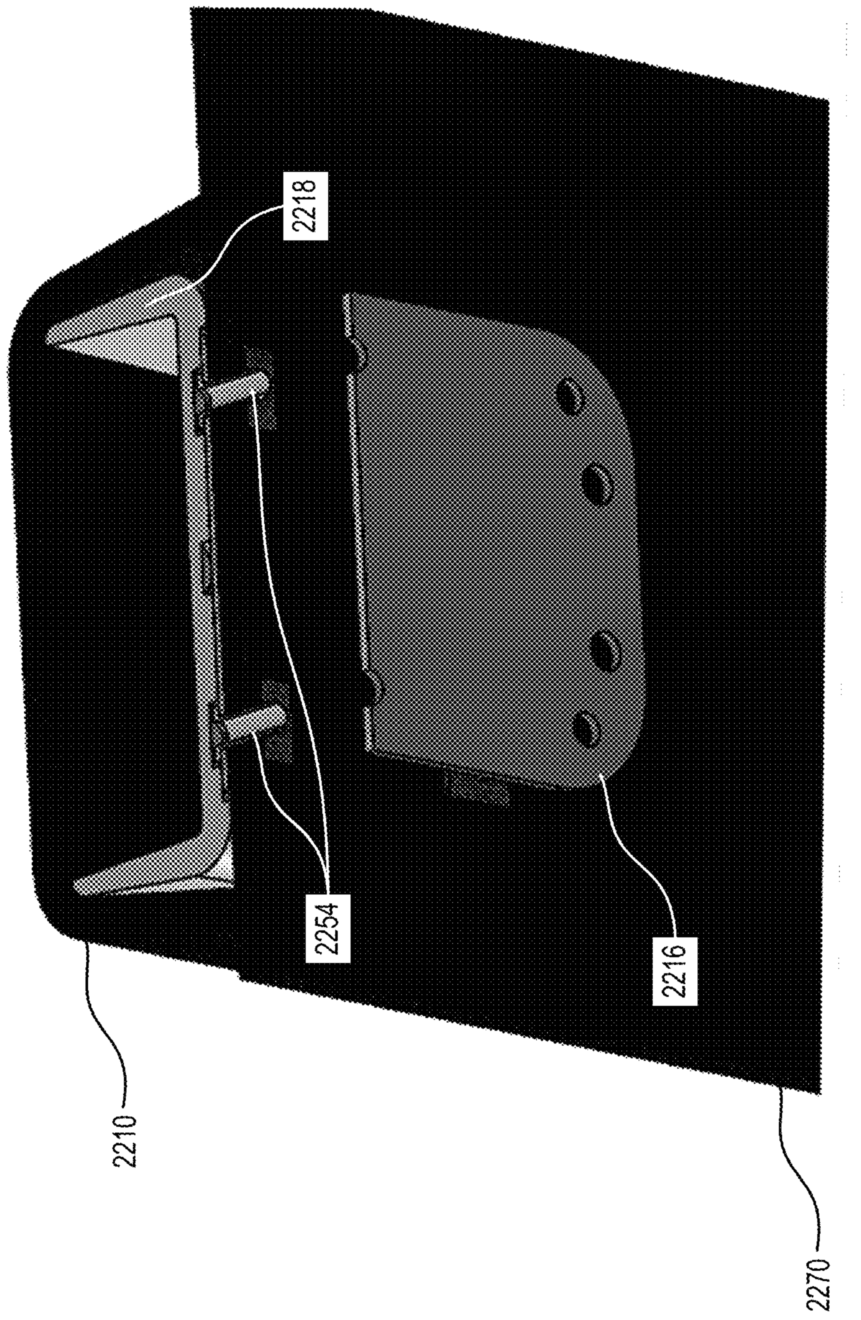
FIG. 24 illustrates an underside, cross-sectional view of the textile interconnection system of FIG. 22.

Reference is made to FIG. 24, which illustrates an underside, cross-sectional view of the textile interconnection system 2200 of FIG. 22. A portion of the textile substrate 2270 may be disposed between the textile docking device 2250/housing 2218 and the support board 2216. Further, the textile receptacle 2210 may project or protrude from a surface of the textile substrate 2270 to form a pocket-like cavity for receiving a controller device.

In some embodiments, the textile receptacle 2210 may project or protrude from the surface of the textile substrate 2270 to form the pocket-like cavity for receiving other electronic devices, such as physiological sensor devices for acquiring physiological data. For instance, the physiological sensor devices may include one-time use electrodes that may require replacement following each physiological data acquisition session.

Figure 25:
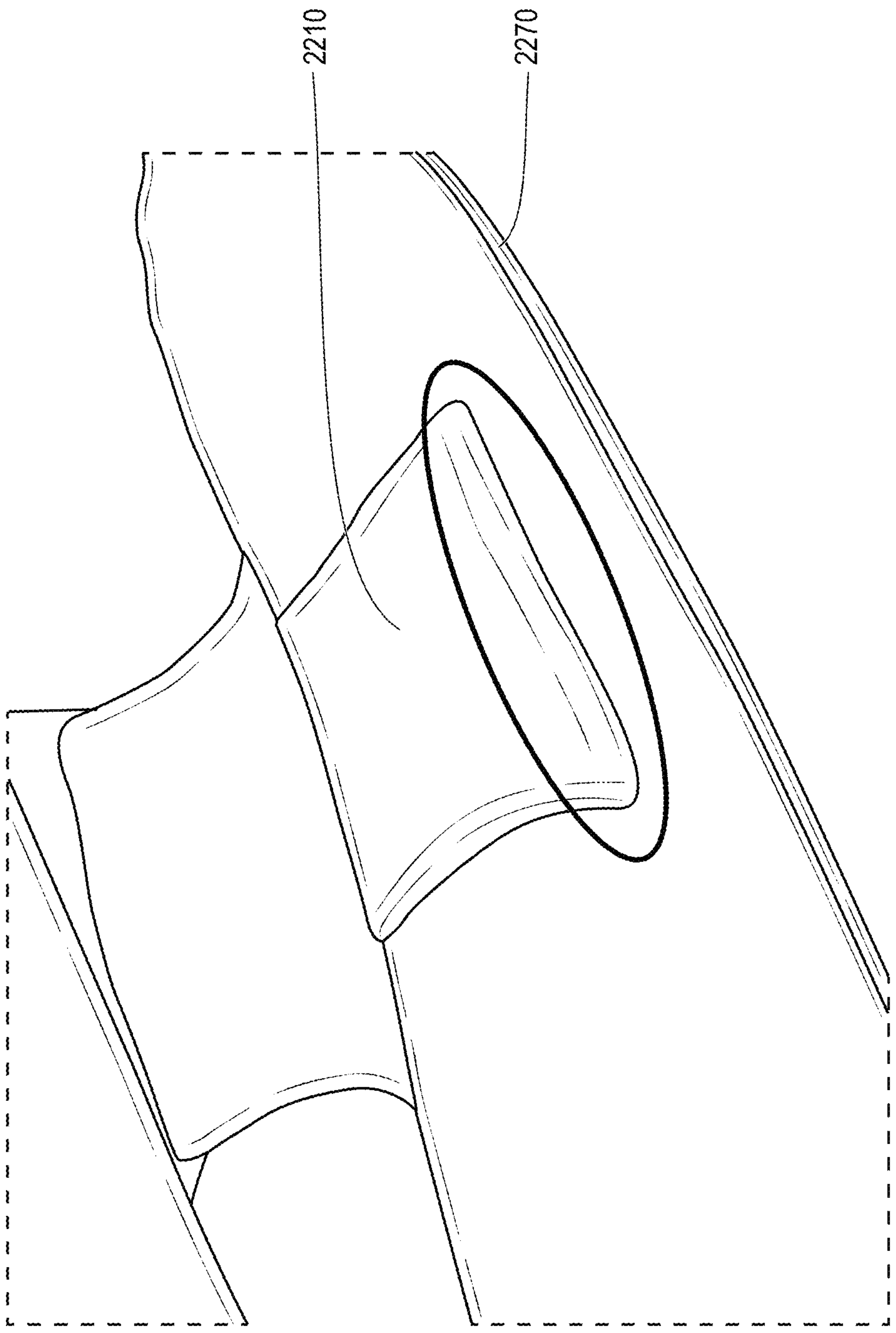
FIG. 25 illustrates a perspective view of an textile interconnection system, in accordance with an embodiment of the present application.

Reference is made to FIG. 25, which illustrates a perspective view of the textile interconnection system 2200 illustrated in FIG. 22. The textile interconnection system includes the textile substrate 2270 and the textile receptacle 2210 projecting or protruding from a portion of the textile substrate 2270.

In the embodiment illustrated in FIG. 25, the textile receptacle 2210 may be a pocket-like cavity projecting from the textile substrate 2270. The textile substrate 2270 may be a garment belt. In some embodiments, the textile receptacle 2210 may be knitted into the textile substrate 2270 and configured to be integral to the garment belt. By knitting the textile receptacle 2210 during production of the textile substrate 2270, the textile substrate 2270 may be more efficiently manufactured. In comparison to methods of gluing or stitching the textile receptacle 2210 to the textile substrate 2270 after the textile substrate 2270 has been manufactured, knitting the textile receptacle 2210 during production of the textile substrate 2270 may result in a more durable textile receptacle 2210 that may not be prone to separation from the textile substrate 2270 due to loose stiches or deteriorating glue. Accordingly, the textile receptacle 2210 may be integrally knitted to the textile substrate 2270.

Figure 26:
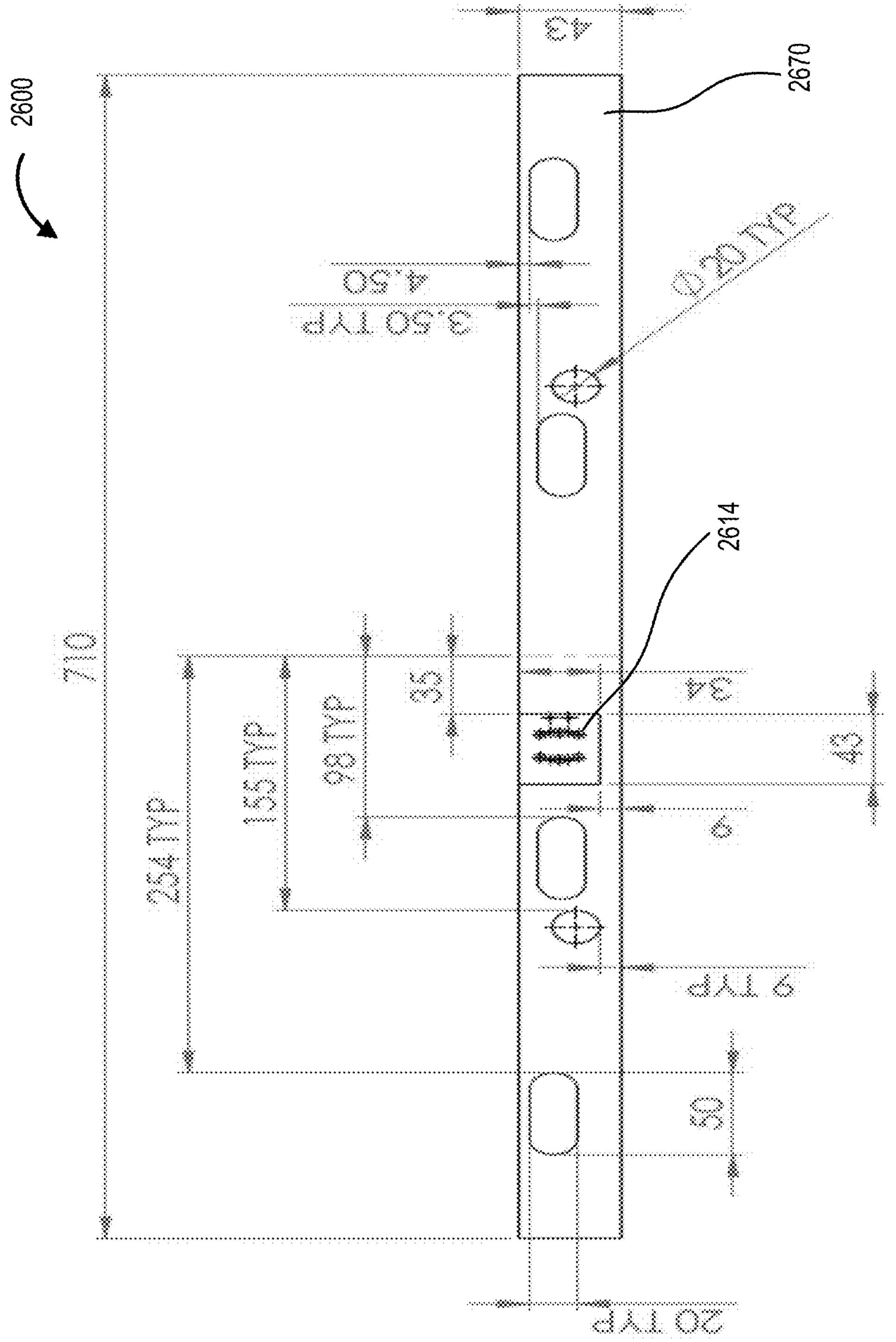
FIG. 26 illustrates a top plan view of a textile interconnection system, in accordance with an embodiment of the present application.

Reference is made to FIG. 26, which illustrates a top plan view of a textile interconnection system 2600, in accordance with an embodiment of the present application. The textile interconnection system 2600 may include a textile substrate 2670. The textile substrate 2670 may include conductive pads 2614 configured to transmit/receive power or data signals between the textile substrate 2670 and a controller device received by the textile interconnection system 2600. In some embodiments, the conductive pads 2614 may be coupled, via conductive traces (not illustrated in FIG. 26), to sensor devices, actuator devices, or other electronic components integrated or embedded throughout the textile substrate 2670.

Figure 27:
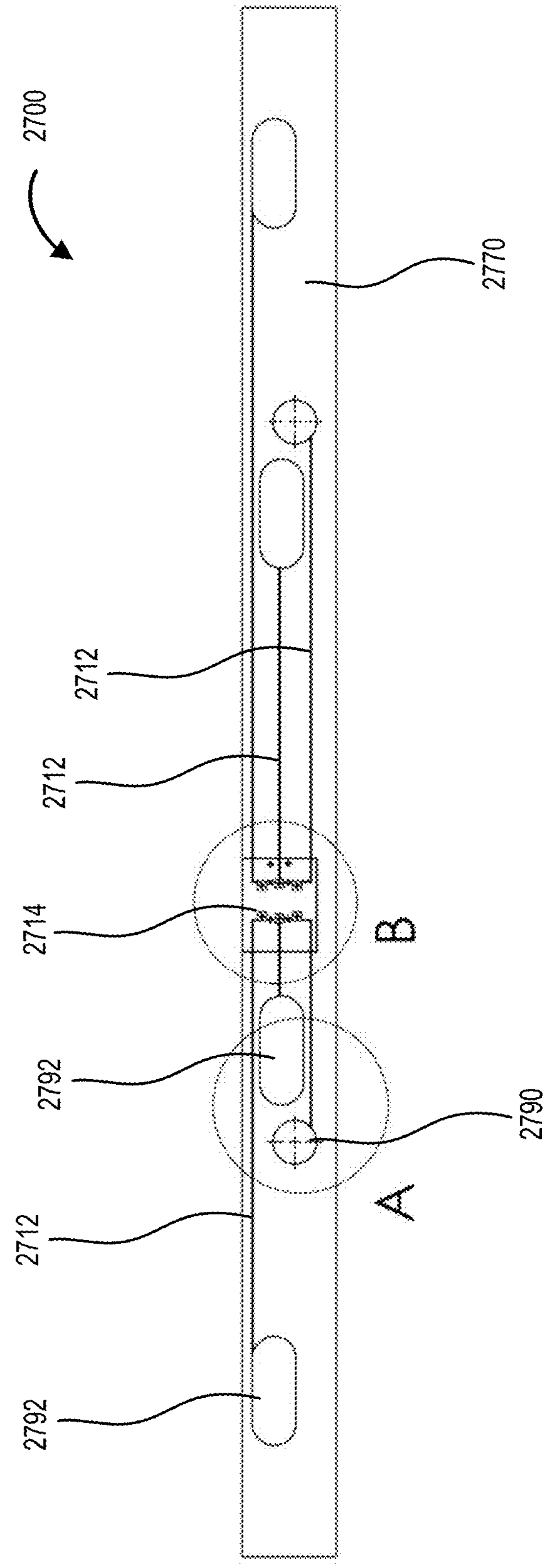
FIG. 27 illustrates a top plan view of a textile interconnection system, in accordance with another embodiment of the present application.

Reference is made to FIG. 27, which illustrates a top plan view of a textile interconnection system 2700, in accordance with another embodiment of the present application. In FIG. 27, a textile substrate 2770 includes one or more conductive traces 2712 and one or more conductive pads 2714 inlaid in the textile substrate 2270. The conductive traces 2712 may be configured to interconnect with one or more sensor devices 2790, one or more actuator devices 2792, or other electronic devices integrated or inlaid on the textile substrate 2270.

Figure 28:
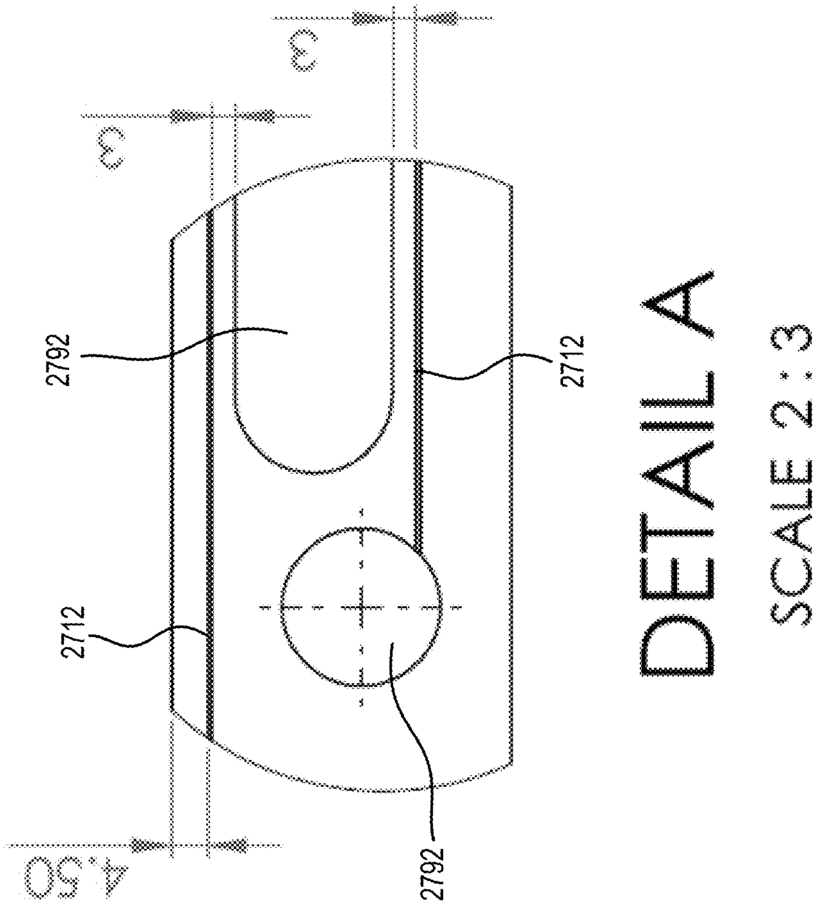
FIG. 28 illustrates an enlarged, top plan view of conductive traces interconnecting with a sensor device of FIG. 27.

Reference is made to FIG. 28, which illustrates an enlarged, top plan view of conductive traces 2712 interconnecting with a sensor device 2790 and/or an actuator device 2792 illustrated in FIG. 27.

Figure 29:
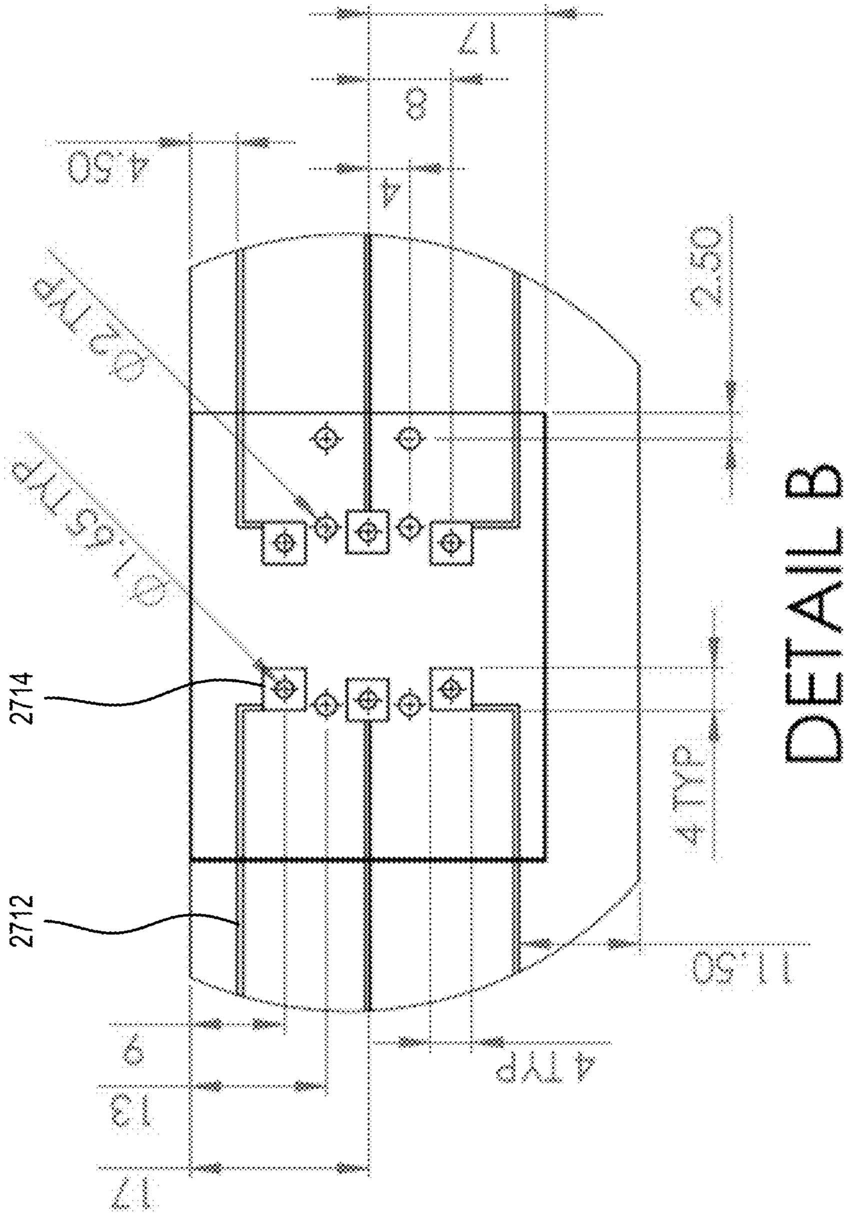
FIG. 29 illustrates an enlarged, top plan view of conductive traces and conductive pads illustrated in FIG. 27.

Reference is made to FIG. 29, which illustrates an enlarged, top plan view of conductive traces 2712 and conductive pads 2714 illustrated in FIG. 27. In FIG. 29, the illustrated conductive traces 2712 and conductive pads 2714 may be configured to substantially align with one or more circuit connection pads 2252 of the textile docking device 2250 (FIG. 22). The illustrated conductive traces 2712 and conductive pads 2714 may be positioned on the portion of the textile substrate 2270 that may correspond to a textile receptacle of a textile interconnection system.

Figure 30:
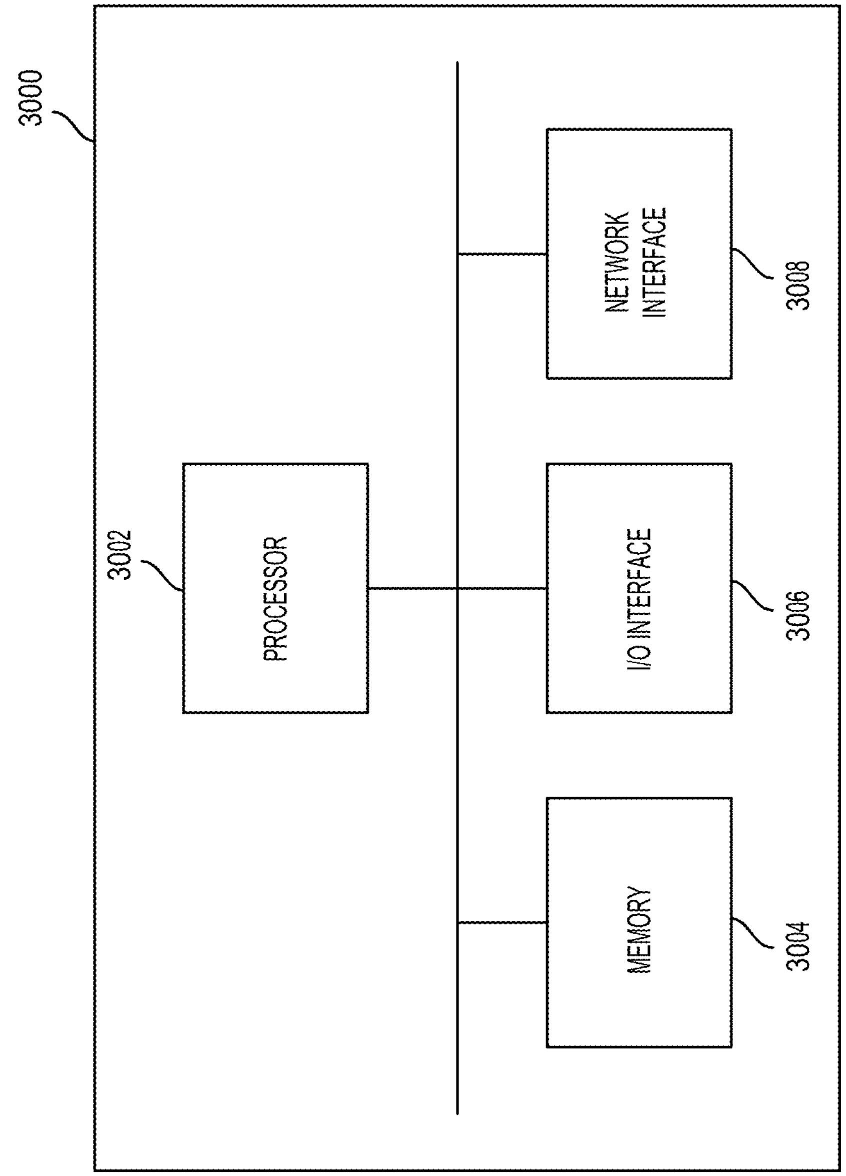
FIG. 30 illustrates a block diagram of a computing device, in accordance with an embodiment of the present application.

Reference is made to FIG. 30, which illustrates a block diagram of a computing device 3000, in accordance with an embodiment of the present application. As an example, a controller device that may be received by or interconnected with a substrate textile by embodiments of textile interconnection systems (e.g. textile interconnection system 2200 of FIG. 22) may be implemented using the example computing device 3000 of FIG. 30.

The computing device 3000 includes at least one processor 3002, memory 3004, I/O interface 3006, and at least one network communication interface 3008.

The processor 3002 may be a microprocessor or microcontroller, a digital signal processing (DSP) processor, an integrated circuit, a field programmable gate array (FPGA), a reconfigurable processor, a programmable read-only memory (PROM), or combinations thereof.

The memory 3004 may include a computer memory that may be located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

The I/O interface 3006 may enable the computing device 3000 to interconnect with one or more input devices, such as a keyboard, mouse, camera, touch screen and a microphone, or with one or more output devices such as a display screen and a speaker.

The network interface 3008 may be configured to receive and transmit data sets, for example, to a target data storage or data structures. The target data storage or data structure may, in some embodiments, reside on a computing device or system such as a mobile device.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As can be understood, the examples described above and illustrated are intended to be exemplary only.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

What is claimed is:

1. A textile interconnection system for a textile substrate, the textile substrate including at least one conductive fibre configured to transmit at least one of a power or data signal, the textile interconnection system comprising:

a textile receptacle projecting from the textile substrate to define a cavity for receiving a controller device;

a textile docking device received within the textile receptacle and coupled to the at least one conductive fibre of the textile substrate to electrically interconnect the received controller device and the textile substrate; and a housing coupled to the textile docking device and received within the textile receptacle to mechanically interconnect the received controller device and the textile substrate, wherein the textile receptacle includes moisture-resistant textile material configured as a moisture barrier.

2. The textile interconnection system of claim 1, wherein the textile receptacle includes textile material that is substantially similar to textile material of the textile substrate.

3. The textile interconnection system of claim 1, comprising a support board coupled to the textile substrate, wherein the textile substrate is disposed between the textile docking device and the support board.

4. The textile interconnection system of claim 3, wherein the textile docking device includes a grommet aligned with an aperture of the textile substrate, wherein the grommet is configured as a vertical interconnect access to electrically interconnect the textile docking device and the support board.

5. The textile interconnection system of claim 1, wherein the textile docking device includes one or more grommets aligned with apertures of the textile substrate for fastening the textile docking device to the textile substrate.

6. The textile interconnection system of claim 1, comprising a magnet coupled to the housing and configured to retain the controller device within the textile receptacle.

7. The textile interconnection system of claim 1, wherein the textile substrate includes a knitted conductive pad, and wherein the textile docking device includes a circuit connection pad configured to align with the knitted conductive pad to provide an electrical interconnection between the received controller device and the textile substrate.

8. The textile interconnection system of claim 1, comprising a data clock generation device coupled to the textile docking device, the data clock generation device configured to generate reference timing signals for transmitting data signals via the at least one conductive fibre.

9. The textile interconnection system of claim 1, wherein the textile receptacle is integrally knitted to the textile substrate.

10. The textile interconnection system of claim 1, wherein the cavity is a pocket-like cavity.

11. A garment comprising:

a garment body including a textile substrate, the textile substrate including at least one conductive fibre configured to transmit at least one of a power or data signal;

a textile interconnection system coupled to the textile substrate, the textile interconnection system including:

a textile receptacle projecting from the textile substrate to define a cavity for receiving a controller device;

a textile docking device received within the textile receptacle and coupled to the at least one conductive fibre of the textile substrate to electrically interconnect the received controller device and the textile substrate; and a housing coupled to the textile docking device and received within the textile receptacle to mechanically interconnect the received controller device and the textile substrate, wherein the textile receptacle includes moisture-resistant textile material configured as a moisture barrier.

12. The garment of claim 11, wherein the textile receptacle includes textile material that is substantially similar to textile material of the textile substrate.

13. The garment of claim 11, comprising a support board coupled to the textile substrate, wherein the textile substrate is disposed between the textile docking device and the support board.

14. The garment of claim 13, wherein the textile docking device includes a grommet aligned with an aperture of the textile substrate, wherein the grommet is configured as a vertical interconnect access to electrically interconnect the textile docking device and the support board.

15. The garment of claim 11, wherein the textile docking device includes one or more grommets aligned with apertures of the textile substrate for fastening the textile docking device to the textile substrate.

16. The garment of claim 11, comprising a magnet coupled to the housing and configured to retain the controller device within the textile receptacle.

17. The garment of claim 11, wherein the textile receptacle is integrally knitted to the textile substrate.

18. The garment of claim 11, wherein the cavity is a pocket-like cavity.

* * * * *